United States Patent
Gundavelli et al.

(10) Patent No.: US 11,950,218 B2
(45) Date of Patent: Apr. 2, 2024

(54) AUTO-CONFIGURATION OF HYBRID CELLS SUPPORTING SHARED CELL AND UNIQUE CELL OPERATING MODES FOR USER EQUIPMENT IN VIRTUALIZED RADIO ACCESS NETWORK ARCHITECTURES

(71) Applicant: Cisco Technology, Inc., San Jose, CA (US)

(72) Inventors: Srinath Gundavelli, San Jose, CA (US); Indermeet Singh Gandhi, San Jose, CA (US); Mark Grayson, Maidenhead (GB); Arun G. Khanna, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 398 days.

(21) Appl. No.: 17/320,522

(22) Filed: May 14, 2021

(65) Prior Publication Data
US 2022/0369324 A1    Nov. 17, 2022

(51) Int. Cl.
*H04W 72/121*    (2023.01)
*H04W 72/044*    (2023.01)
(Continued)

(52) U.S. Cl.
CPC ....... *H04W 72/121* (2013.01); *H04W 72/046* (2013.01); *H04W 72/30* (2023.01); *H04W 76/11* (2018.02)

(58) Field of Classification Search
None
See application file for complete search history.

(56) References Cited

U.S. PATENT DOCUMENTS

2013/0003695 A1    1/2013 Nylander et al.
2013/0235785 A1    9/2013 Sebire et al.
(Continued)

FOREIGN PATENT DOCUMENTS

CN    108235339 A    6/2018
CN    111918297    * 10/2020
(Continued)

OTHER PUBLICATIONS

3GPP, "3rd Generation Partnership Project; Technical Specification Group Radio Access Network; Evolved Universal Terrestrial Radio Access Network (E-UTRAN); S1 Application Protocol (S1AP) (Release 16)," 3GPP TS 36.413 V16.4.0 (Jan. 2021), Technical Specification, Jan. 2021, 423 pages.
(Continued)

*Primary Examiner* — Mohammad S Adhami
(74) *Attorney, Agent, or Firm* — Edell, Shapiro & Finnan, LLC

(57) ABSTRACT

Presented herein are techniques to facilitate the configuration of hybrid cells to support shared cell and unique cell operating modes for user equipment. In one example, a method may include obtaining a registration request for a user equipment (UE) in which the mobile network includes a radio access network (RAN) comprising a plurality of radio units (RUs) in which each RU provides a shared cell that is shared with at least one other RU and each RU also provides a unique cell that is not shared with any other RU. The method may further include determining an operating mode for the UE in which the operating mode indicates whether the UE is to operate in a shared cell or a unique cell operating mode, and facilitating connection of the UE to one of the shared cell or the unique cell of an RU based on the operating mode.

20 Claims, 7 Drawing Sheets

(51) Int. Cl.
  *H04W 72/30* (2023.01)
  *H04W 76/11* (2018.01)

(56) References Cited

U.S. PATENT DOCUMENTS

| | | | |
|---|---|---|---|
| 2013/0237225 A1 | 9/2013 | Martin | |
| 2015/0016299 A1 | 1/2015 | Zhang et al. | |
| 2015/0271683 A1* | 9/2015 | Yan | H04W 48/20 |
| | | | 370/329 |
| 2015/0296449 A1 | 10/2015 | Shu et al. | |
| 2016/0037550 A1* | 2/2016 | Barabell | H04W 72/1263 |
| | | | 455/450 |
| 2017/0105112 A1 | 4/2017 | Park et al. | |
| 2019/0141586 A1 | 5/2019 | Olsson et al. | |
| 2019/0223055 A1 | 7/2019 | Bor Yaliniz et al. | |
| 2020/0029338 A1 | 1/2020 | Lee et al. | |
| 2020/0045583 A1 | 2/2020 | Kim et al. | |
| 2020/0053005 A1 | 2/2020 | Balasubramanian et al. | |
| 2020/0053622 A1 | 2/2020 | Huang-Fu et al. | |
| 2020/0092758 A1 | 3/2020 | Youn et al. | |
| 2020/0092774 A1 | 3/2020 | Sharma et al. | |
| 2020/0127785 A1 | 4/2020 | Blankenship et al. | |
| 2020/0128432 A1 | 4/2020 | Youn et al. | |
| 2020/0154350 A1 | 5/2020 | Dao et al. | |
| 2020/0187085 A1 | 6/2020 | Jagannatha et al. | |
| 2020/0204252 A1 | 6/2020 | Barbieri et al. | |
| 2020/0275348 A1 | 8/2020 | Park et al. | |
| 2020/0314950 A1 | 10/2020 | Dao et al. | |
| 2020/0351702 A1 | 11/2020 | Stojanovski et al. | |
| 2020/0383009 A1 | 12/2020 | Qiao et al. | |
| 2020/0389835 A1 | 12/2020 | Talebi Fard et al. | |
| 2020/0412438 A1 | 12/2020 | Yang et al. | |
| 2021/0022024 A1 | 1/2021 | Yao et al. | |
| 2021/0051545 A1 | 2/2021 | Luo et al. | |
| 2021/0243839 A1 | 8/2021 | Krishnaswamy et al. | |
| 2022/0078631 A1 | 3/2022 | Salahuddeen et al. | |
| 2022/0264415 A1* | 8/2022 | Khirallah | H04W 76/20 |
| 2022/0303847 A1 | 9/2022 | Wu et al. | |
| 2022/0369163 A1* | 11/2022 | Gundavelli | H04W 28/0925 |
| 2022/0369404 A1* | 11/2022 | Gundavelli | H04W 76/15 |
| 2022/0377507 A1 | 11/2022 | Xie et al. | |

FOREIGN PATENT DOCUMENTS

| | | |
|---|---|---|
| EP | 2757844 A1 | 7/2014 |
| WO | 2014163570 A1 | 10/2014 |
| WO | 2017/173259 A1 | 10/2017 |
| WO | 2020/100053 A1 | 5/2020 |
| WO | 2021069067 A1 | 4/2021 |
| WO | 2021071397 A1 | 4/2021 |

OTHER PUBLICATIONS

3GPP, "3rd Generation Partnership Project; Technical Specification Group Radio Access Network; NR; Radio Resource Control (RRC) protocol specification (Release 16)," 3GPP TS 38.331 V16.4.1 (Mar. 2021), Technical Specification, Mar. 2021, 949 pages.

3GPP, "3rd Generation Partnership Project; Technical Specification Group Radio Access Network; NG-RAN; Xn application protocol (XnAP) (Release 16)," 3GPP TS 38.423 V16.4.0 (Jan. 2021), Technical Specification, Jan. 2021, 457 pages.

3GPP, "3rd Generation Partnership Project; Technical Specification Group Radio Access Network; NG-RAN; F1 application protocol (F1AP) (Release 16)," 3GPP TS 38.473 V16.5.0 (Apr. 2021), Technical Specification, Apr. 2021, 463 pages.

Share Technote, "5G/NR—Beam Management," https://www.sharetechnote.com/html/5G/5G_Phy_BeamManagement.html, retrieved Apr. 26, 2021, 14 pages.

Patel, et al., "5G meets Time Sensitive Networking," https://www.ericsson.com/en/blog/2018/12/5g-meets-time-sensitive-networking, Dec. 18, 2018, 7 pages.

O-RAN Alliance, "O-RAN Fronthaul Control, User and Synchronization Plane Specification 5.0," O-RAN.WG4.CUS.0-v05.00, Technical Specification, Nov. 2020, 291 pages.

Metaswitch, "What is 5G beamforming, beam steering and beam switching with massive MIMO," https://www.metaswitch.com/knowledge-center/reference/what-is-beamforming-beam-steering-and-beam-switching-with-massive-mimo, retrieved Apr. 26, 2021, 6 pages.

Cisco, "Operator Specific QCI," MME Administration Guide, StarOS Release 21.20, https://www.cisco.com/c/en/us/td/docs/wireless/asr_5000/21-20_6-14/MME-Admin/21-20-mme-admin/21-17-MME-Admin_chapter_01000001.html, Jul. 2020, 6 pages.

3GPP, "3rd Generation Partnership Project; Technical Specification Group Core Network and Terminals; Non-Access-Stratum (NAS) protocol for 5G System (5GS); Stage 3; (Release 17)," 3GPP TS 24.501 V17.2.1 (Apr. 2021), Technical Specification, Apr. 2021, 758 pages.

3GPP, "3rd Generation Partnership Project; Technical Specification Group Services and System Aspects; System architecture for the 5G System (5GS); Stage 2 (Release 17)," 3GPP TS 23.501 V17.0.0 (Mar. 2021), Technical Specification, Mar. 2021, 489 pages.

Wikipedia, "Cell Global Identity," https://en.wikipedia.org/wiki/Cell_Global_Identity, Jan. 2020, 3 pages.

3GPP, "3rd Generation Partnership Project; Technical Specification Group Radio Access Network; NR; Radio Resource Control (RRC) protocol specification (Release 16)," 3GPP TS 38.331 V16.3.1 (Jan. 2021), Technical Specification, Jan. 2021, 932 pages.

3GPP, "3rd Generation Partnership Project; Technical Specification Group Radio Access Network; NR; NR and NG-RAN Overall Description; Stage 2 (Release 16)," 3GPP TS 38.300 V16.5.0 (Mar. 2021), Technical Specification, Mar. 2021, 151 pages.

Techplayon, "5G NR Physical Cell ID (PCI) Planning," https://www.techplayon.com/5g-nr-physical-cell-id-pci-planning/, Nov. 2019, 4 pages.

3GPP, "3rd Generation Partnership Project; Technical Specification Group Services and System Aspects; Security architecture and procedures for 5G system (Release 17)," 3GPP TS 33.501 V17.1.0 (Mar. 2021), Technical Specification, Mar. 2021, 256 pages.

3GPP, "3rd Generation Partnership Project; Technical Specification Group Services and System Aspects; Policy and charging control framework for the 5G System (5GS); Stage 2 (Release 17)," 3GPP TS 23.503 V17.0.0 (Mar. 2021), Technical Specification, Mar. 2021, 128 pages.

Derham, et al., "3GPP WLAN integration in 5G System—Release 17," IEEE 802.11-19/1215r0, https://mentor.ieee.org/802.11/dcn/19/11-19-1215-00-AANI-3gpp-wlan-integration-in-5g-system-rel-17.pptx, Jul. 2019, 11 pages.

3GPP, "3rd Generation Partnership Project; Technical Specification Group Radio Access Network; Evolved Universal Terrestrial Radio Access (E-UTRA) and NR; Multi-connectivity; Stage 2 (Release 16)," 3GPP TS 37.340 V16.5.0 (Mar. 2021), Technical Specification, Mar. 2021, 84 pages . . . .

O-RAN Alliance, "O-RAN Fronthaul Working Group Control, User and Synchronization Plane Specification 3.0," O-RAN.WG4.CUS.0-v03.00, Technical Specification, Mar. 2020, 253 pages.

* cited by examiner

AUTO-CONFIGURATION OF HYBRID CELLS SUPPORTING SHARED CELL AND UNIQUE CELL OPERATING MODES FOR USER EQUIPMENT IN VIRTUALIZED RADIO ACCESS NETWORK ARCHITECTURES

TECHNICAL FIELD

The present disclosure relates to network equipment and services.

BACKGROUND

Networking architectures have grown increasingly complex in communications environments, particularly mobile networking environments. In particular, virtualized Radio Access Network (vRAN) architectures have been developed to provide radio coverage for mobile networks. However, there are significant challenges in managing radio coverage for vRAN architectures in order to provide services for user equipment.

DESCRIPTION OF EXAMPLE EMBODIMENTS

Overview

Figure 1:
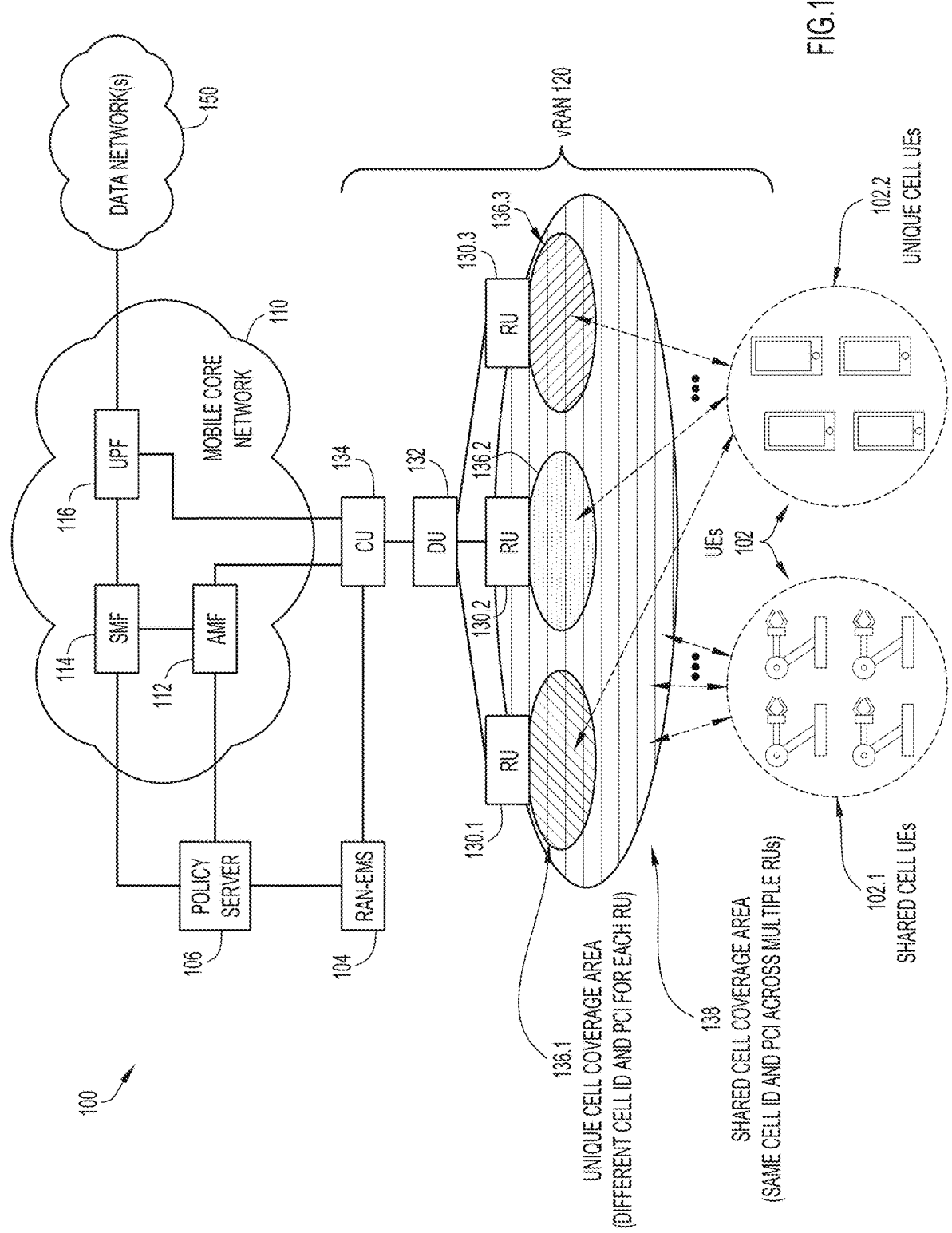
FIG. 1 is a diagram of a system in which techniques may be implemented to facilitate auto-configuration of hybrid cells to support shared cell and unique cell operating modes for user equipment in a virtualized Radio Access Network (vRAN) architecture, according to an example embodiment.

Techniques presented herein may define an approach for providing hybrid cells that support both shared cell and unique cell operating modes in Radio Access Network architectures, such as a virtualized RAN (vRAN) architectures. In particular, techniques herein may facilitate the auto-configuration of hybrid cells operating in both shared cell and unique cell operating modes concurrently, efficient sharing of RAN resources between the shared cell and unique cell operating modes, and may also provide for the classification of different user equipment (UE) based on device type, etc. in order to bind UEs to one of the two configuration/operating modes.

In one embodiment, a method is provided that may include obtaining, by a network element of a mobile network, a registration request for a user equipment, wherein the mobile network includes a radio access network comprising a plurality of radio units in which each radio unit of the plurality of radio units provides a shared cell that is shared with other radio units of the plurality of radio units and each radio unit of the plurality of radio units provides a unique cell that is not shared with other radio units of the plurality of radio units; determining an operating mode for the user equipment, wherein the operating mode indicates whether the user equipment is to operate in a shared cell operating mode or a unique cell operating mode; and facilitating service connection of the user equipment to one of the shared cell or the unique cell of a radio unit of the radio access network based on the operating mode for the user equipment.

EXAMPLE EMBODIMENTS

As referred to herein, an 'enterprise' or 'enterprise entity' may be considered to be a business, government, educational institution, an organization, and/or the like that may include multiple enterprise locations (or sites), such as a main campus, remote branches, any operating environment of private 5G (e.g., factory floor, port, mining facility, electric grid, etc.) and so on. Enterprise devices (e.g., enterprise user equipment (UE), etc.) that may be owned, operated, and/or otherwise associated with an enterprise may be utilized by enterprise users to serve enterprise purposes (e.g., business purpose, government purpose, educational/university purpose, etc.) of the enterprise. In some instances, an enterprise may operate an enterprise network, also referred to as an enterprise data network, which may be a network implemented to serve enterprise purposes (e.g., host enterprise applications/services/etc., perform authentications and/or authorizations, etc. for enterprise users associated with one or more UE, and/or the like).

Further as referred to herein, a wireless wide area (WWA) access network, such as a cellular/Third (3rd) Generation Partnership Project (3GPP) access networks, may be characterized as a Radio Access Network (RAN) having radio nodes such as evolved Node Bs (eNBs or eNodeBs) for Fourth (4th) Generation (4G)/Long Term Evolution (LTE) access networks, next generation Node Bs (gNBs or gNodeBs) for Fifth (5th) Generation (5G) and/or next Generation (nG) access networks, and/or the like that provide a larger RAN coverage area as compared to the RAN coverages area typically provided by wireless local area (WLA) radio nodes (e.g., Institute of Electrical and Electronics Engineers (IEEE) 802.11 access points, Wi-Fi® access points, Wi-Fi6® access points, etc.). Stated differently, the WWA RAN coverage area provided by a WWA radio node is typically larger (sometimes orders of magnitude larger, for example, up to a ratio of 1:5, depending on spectrum and power regulations) than the WLA RAN coverage area provided by a WLA radio node. Additionally, a WWA RAN radio node can typically provide radio access connectivity for a larger number of devices as compared to a WLA RAN radio node. Depending on implementation, any combination of WWA and/or WLA RANs may be utilized to facilitate connections between one or more devices and any combination of Local Area Networks (LANs), such as an enterprise network for an enterprise location; Wide Area Networks (WANs), such as the Internet, multiple enterprise networks spread across multiple locations; Software Defined WAN (SD-WAN); and/or any other network architecture/environment.

In some instances, an access network, such as a WWA access network, may be referred to as a private access network. By 'private' it is meant that a private WWA access network (e.g., a Citizen Broadband Radio Service (CBRS)

access network and/or a 3GPP cellular (4G/LTE, 5G, nG, etc.) access network) may provide network connectivity/services to clients (e.g., users/user equipment/devices/etc.) served by a network operator and/or service provider of the private WWA access network, such as an enterprise. In one example, a private WWA access network may be considered to be a network that may be implemented to serve enterprise purposes (e.g., business purposes, government purposes, educational purposes, etc.) for enterprise clients (e.g., enterprise users/user equipment/devices/etc.) in which the private WWA access network may be operated by any combination of traditional public mobile network operators/service providers, enterprises network operators/service providers (e.g., Cisco®, etc.), and/or third party network operators/service providers (e.g., neutral host network operators/service providers, cloud service providers, etc.). A private network may also be referred to as a standalone non-public network (SNPN) or a Public Network Integrated Non-Public Network (PNI-NPN) in some instances. Cisco is a registered trademark of Cisco Technology, Inc.

Discussed herein are features associated with vRAN architectures that may be provided for different radio accesses. In some instances, a vRAN architecture can be implemented as a disaggregated vRAN architecture that includes the split of a base station, such as a gNB, into a Central (or Centralized) Unit (CU), one or several Distributed Units (DUs), and one or several Radio Units (RUs). Further disaggregation may include separation of the CU into a Central Unit Control Plane (CU-CP) component and a Central Unit User Plane (CU-UP) component. In some instances, certain vRAN components may also be referred to as virtualized components (e.g., virtualized DU (vDU) components, and/or virtualized CU (vCU) components). For a vRAN architecture, one or more RU(s) can interface with a DU component, which further interfaces with a CU-CP component and a CU-UP component. In some instances, such as for shared cell vRAN architectures as discussed in further detail herein, multiple DUs (each interfacing with corresponding RU(s)) can interface with a CU-CP component and a CU-UP component.

Referring to FIG. 1, FIG. 1 is a block diagram of a system 100 in which techniques may be implemented to facilitate auto-configuration of hybrid cells to support shared cell and unique cell operating modes for user equipment in a vRAN architecture, according to an example embodiment. System 100 includes a number of UEs 102, a RAN Element Management System (RAN-EMS) 104, a policy server 106, a mobile core network 110, and a vRAN 120, which may be inclusive of a disaggregated vRAN 120. In at least one embodiment, mobile core network 110 may be representative of a 5G core network (5GC) including an Access and Mobility Management Function (AMF) 112, a Session Management Function (SMF) 114, and a User Plane Function (UPF) 116. Although not illustrated, mobile core network 110 may also include any combination of 4G/nG network elements.

The vRAN 120 may include a number of radio units (RUs) 130, including a first RU 130.1 (also referred to herein as RU 130.1), a second RU 130.2 (also referred to herein as RU 130.2), and a third RU 130.3 (referred to herein as RU 130.3). Each of RU 130.1, 130.2, and 130.3 may interface with a distributed unit (DU) component 132 (also referred to herein as DU 132), which may further interface with a central (or centralized) unit (CU) component 134 (also referred to herein as CU 134). One or more data network(s) 150 are also shown in FIG. 1. The interface/interconnection between each RU 130.1, 130.2, and 130.3 and DU 132 is typically referred to as a fronthaul network. The interface/interconnection between DU 132 and CU 134 can be referred to as a midhaul network.

UEs 102 may include different UE types or groups, such as a first type or group of UEs 102.1 and a second type or group of UEs 102.2. In one example, UEs 102.1 may be an Ultra-Reliable and Low-Latency Communication (URLLC) type or group of UEs and UEs 102.2 may be an enhanced Mobile Broadband (eMBB) type or group of UEs. Generally, UEs 102.1 may be referred to herein interchangeably as 'shared cell UEs 102.1', 'shared cell operating mode UEs 102.1', or variations thereof and UEs 102.2 may be referred to herein interchangeably as 'unique cell UEs 102.2', 'unique cell operating mode UEs 102.2', or variations thereof. It is to be understood that any number of types/groups of UEs may be present for system 100.

As illustrated in FIG. 1, CU 134 can further interface with RAN-EMS 104, AMF 112, and UPF 116. AMF 112 can further interface with policy server 106 and SMF 114, which may further interface with UPF 116. UPF 116 may also interface with data network(s) 150. SMF 114 may also interface with policy server 106. The interface/interconnection between CU 134 and elements of the mobile core network 110 is typically referred to as a backhaul network.

An RU, such as any of RUs 130.1-130.3, may implement any combination of a WWA (e.g., cellular) and/or WLA (e.g., Wi-Fi®) air interface for any combination of Radio Access Technology (RAT) types (sometimes referred to more generally as 'accesses') for vRAN 120 such as, but not limited to: 3GPP licensed spectrum accesses (e.g., 3rd Generation (3G), 4G/LTE, 5G, and/or next Generation (nG) accesses); 3GPP unlicensed spectrum accesses (e.g., Licensed-Assisted Access (LAA), enhanced LAA (eLAA), further enhanced LAA (feLAA), and New Radio Unlicensed (NR-U)); non-3GPP unlicensed spectrum accesses such as Institute of Electrical and Electronics Engineers (IEEE) 802.11 (e.g., Wi-Fi®); IEEE 802.16 (e.g., WiMAX®), Near Field Communications (NFC), Bluetooth®, and/or the like; Citizens Broadband Radio Service (CBRS) accesses; combinations thereof; and/or the like.

Thus, an RU may be inclusive of any configuration/combination of 3GPP 4G/LTE evolved Node Bs (eNBs or eNodeBs), 5G next Generation Node Bs (gNBs or gNodeBs), and/or any other next Generation access nodes that may include hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to provide over-the-air Radio Frequency (RF) coverage for one or more access types (e.g., 4G/LTE, 5G, nG, CBRS, etc.) through which one or more UE, such as any of UEs 102, may utilize to connect to one or more RUs for one or more sessions (e.g., voice, video, data, gaming, combinations thereof, etc.). More generally, an RU may perform lower Physical (PHY) layer and RF operations to facilitate RF connections with one or more UE. The coverage area of a radio node such as an eNB, gNB, RU, etc. is typically referred to as a 'cell' in which one or more UE may attach to the radio node that serves the coverage area/cell such that service connection to a network may be facilitated via the cell provided by the radio node.

A DU (also sometimes referred to as a baseband unit), such as DU 132, may provide lower level operations of the radio signal processing stack, such as Radio Link Control (RLC), Medium Access Control (MAC), and higher PHY layer operations, such as digital processing, including signal modulation and demodulation, channel encoding and decoding, and scheduling, among others. A CU, such as CU 134, may provide upper level operations of a radio signal processing stack, such as user plane Packet Data Convergence Protocol (PDCP) functions and user plane Service Data Adaptation Protocol (SDAP), among others. The split of operations of a radio signal processing stack among between a DU a CU can be varied depending on implementation and/or configuration of a given vRAN/network architecture. A CU, such as CU 134, can also operate to DU(s), such as DU 132, for a vRAN architecture via Resource Control (RRC) functions and the control plane part of the PDCP protocol. In some embodiments, CU 134 may be further disaggregated into a CU-CP component and a CU-UP component.

In addition to radio signal processing operations, CU 134, DU 132, and RUs 130.1-130.3 may perform additional operations as discussed for various embodiments herein.

A UE, such as any of UEs 102.1 and 102.2, may be associated with any user, subscriber, employee, client, customer, electronic device, etc. wishing to initiate a flow in system 100 and may be inclusive of any device that initiates a communication in system 100, such as a computer, an electronic device such as an industrial device (e.g., a robot), automation device, enterprise device, appliance, Internet of Things (IoT) device (e.g., sensor, monitor, etc.), a laptop or electronic notebook, a router with a WWA/WLA interface, a WWA/WLA (cellular/Wi-Fi®) enabled telephone/smart phone, tablet, etc. and/or any other device, component, element, or object capable of initiating voice, audio, video, media, or data exchanges within system 100. It is to be understood that UEs discussed herein may also be configured with any combination of hardware (e.g., communications units, receiver(s), transmitter(s), transceiver(s), antenna(s) and/or antenna array(s), processor(s), memory element(s), baseband processor(s) (modems), etc.)], controllers, software, logic, and/or any other elements/entities that may facilitate over-the-air RF connections with one or more access networks. As referred to herein, the terms 'UE' and 'UE device' can be used interchangeably.

In addition to various operations discussed for techniques herein, an AMF, such as AMF 112, may facilitate access and mobility management control/services for one or more UE, such as UEs 102, to facilitate one or more over-the-air (OTA) RF connection(s) between the UE 102 and the vRAN 120. In addition to various operations discussed for techniques herein, an SMF, such as SMF 114, may be responsible for UE Protocol Data Unit (PDU) session management (SM), with individual functions/services being supported on a per-session basis in order to facilitate data transfer(s) between a UE and one or more data network(s). Generally, a UPF, such as UPF 116, may operate as a Virtual or Virtualized Network Function (VNF) to provide packet routing and forwarding operations for user data traffic and may also perform a variety of functions such as packet inspection, traffic optimization, Quality of Service (QoS), policy enforcement and user data traffic handling (e.g., to/from data network(s) 150), and billing operations (e.g., accounting, etc.) for UE 102 sessions.

It is to be understood that other network elements may be configured for mobile core network 110 for any combination of 3G/4G/5G/nG implementations, such as, a Policy Control Function (PCF), a Policy and Charging Rules Function (PCRF), a Network Slice Selection Function (NSSF), a Network Repository Function (NRF), a Unified Data Management (UDM) service, a Unified Data Repository (UDR), a Home Subscriber Server (HSS), a Mobility Management Entity (MME), a Serving Gateway (SGW), a Packet Data Network (PDN) Gateway (PGW), any Control and User Plane Separation (CUPS) components, and/or the like in accordance with any 3GPP specifications.

In various embodiments, the data network(s) 150 of FIG. 1 may be any combination of the Internet, an Internet Protocol (IP) Multimedia Subsystem (IMS), Ethernet network, Ethernet switching system(s), and/or the like.

Generally, RAN-EMS 104 may operate to configure, update, and/or otherwise manage resources for vRAN 120 via CU 134, DU 132, and RUs 130.1, 130.2, and 130.3 and policy server 106 may provide for maintaining/storing one or more policies for vRAN 120 and/or UEs 102 in accordance with embodiments described herein. Although illustrated as separate elements for the embodiment of FIG. 1, in some instances, RAN-EMS 104 and policy server 106 may be implemented as a combined element. For example, in some instances, RAN-EMS 104 and policy server 106 may be implemented as any combination of a Cisco® Digital Network Architecture Center (DNA-C), a Cisco® RAN Element Management System (RAN-EMS) an enterprise domain controller, including Meraki® cloud, and/or the like. Meraki® is a registered trademark of Meraki, LLC, a wholly owned subsidiary of Cisco Systems, Inc. In various embodiments, policy server 106 may be any combination of an Authentication, Authorization, and Accounting (AAA) function/server, a PCF/PCRF, a HSS, a UDM, and/or the like. In one instance, policy server may be implemented as a Cisco® Identity Services Engine (ISE), which may support any combination of Remote Authentication Dial-In User Service (RADIUS) and/or Diameter protocols.

A RAN, such as vRAN 120, can be configured to operate in two modes: a) unique cell configuration/operating mode, and b) shared cell configuration/operating mode. Generally, the unique cell mode is the most widely used configuration/operating mode where in which each RU operates as a unique cell with a unique cell identifier. Current public cellular networks often operate in the unique cell mode.

The shared cell mode is a special configuration/operating mode in which multiple RUs that are part of a shared cell form to become one giant cell, sometimes referred to as a 'super cell'. In this configuration mode, all the RUs that are part of this giant cell share the same cell identifiers and operate in the same frequency bands. As referred to herein, shared cells and unique cells can be referred to as cell types.

The identifiers that provide a unique identity to a cell, whether configured as unique cell or a shared cell, are Physical Cell Identifier (PCI), and Cell Global Identity (CGI). The term 'PCI' is typically used in reference to 4G/LTE implementations, whereas the term 'New Radio PCI' (NR-PCI) is typically used in reference to 5G-New Radio (5G-NR) implementations. Further, CGI for 4G/LTE implementations is referred to as Evolved Universal Mobile Telecommunications System (UMTS) Terrestrial Radio Access Network (E-UTRAN) CGI (E-CGI) and CGI for 5G-NR is referred to as NR-CGI.

A shared cell configuration has many advantages. For example, all RUs that are part of shared cell can all serve a given UE at any given point of time. A transmitted frame from a given UE will be received by all of the RUs in their RF reachability range. The implication of this is that the UE is not required to perform handovers as it moves from one RF connection with one RU to an RF connection with another RU within the same shared cell, meaning there are no handovers within the same shared cell. In particular, handover involves the careful co-ordination and configuration of parameters in neighboring cells, including the optimization of hysteresis levels that control the triggering of the handover procedure. In contrast, by operating with a shared cell configuration, no optimization of such parameters is involved. The shared cell mode also eliminates any cell border interference issues, as all the RUs are operating in the same frequency bands. Additionally, the shared cell operating mode offers improved reliability over the unique cell operating mode, as there may be more than one RU receiving a frame transmitted by a given UE operating in the shared cell operating mode.

The shared cell configuration/operating mode can be very useful in industrial applications, such as factory floor automation applications in which a URLLC type or level of service is a baseline requirement. The traffic profile of these types of services dictate a very low handover latency and high-reliability (in the order of packet losses less than 1 in million packets). The shared cell configuration mode, with its inherent spatial diversity properties is well suited for such sensitive applications.

However, the shared cell configuration also incurs a cost; the capacity of the shared cell (encompassing multiple RUs) reduces to the size of a single cell (with one RU). For example, if each RU for a deployment operating in a unique cell mode can support 'n' UE connections, the capacity of the vRAN with 'm' radio units is 'n multiplied by m'. However, for RUs operating in a shared cell mode, the capacity of the shared cell is still 'n' UE connections.

Given the above characterization of shared and unique cell modes, each with its own set of advantages and disadvantages, one challenge for implementations may include determining the preferred mode (unique cell or shared cell) for private 5G deployments targeting industrial automation use cases. A factory floor often has a mixed set of applications; some UEs/applications may involve URLLC services from the network that would benefit from shared cell connectivity, while other UEs/applications may involve basic (unique cell) connectivity services involving support for a basic traffic profile. Thus, while utilization of a shared cell may be advantageous for one set of UEs/applications, the same configuration may be an in efficient use of network resources for a large set of other applications.

Therefore, operating either just a shared cell or unique cells in these hybrid application environments may be a non-starter as neither of the two modes, on their own, may satisfy both network scale and application requirements. Thus, it would be advantageous to provide a hybrid configuration mode that encompasses both shared and unique cell configuration modes along with intelligence/logic within the network to facilitate efficient sharing of RAN resources between the two modes.

In accordance with techniques discussed herein, system 100 may provide for defining a new mode, referred to as a 'hybrid cell configuration mode' or, more broadly, a 'hybrid cell', for use in enterprise private 5G/ng deployments via vRAN 120. In particular, a new hybrid cell approach is provided in which an RU/cell can be operated in both shared cell and unique cell configuration/operating modes concurrently.

Accordingly, vRAN 120, may be configured to provide 3GPP private 4G/LTE, 5G/NR, and/or CBRS mobile network services via mobile core network 110 functions (e.g., EPC/5GC functions), along with CU 134, DU 132, and respective RUs 130.1, 130.2, and 130.3 providing respective unique cell coverage areas 136.1 (provided by RU 130.1 in at least one embodiment), 136.2 (provided by RU 130.2 in at least one embodiment), and 136.3 (provided RU 130.3 in at least one embodiment) and a shared cell coverage area 138 (provided by all of RUs 130.1, 130.2, and 130.3 in at least one embodiment). As referred to herein, the terms 'cell coverage area' and 'cell' may be referred to interchangeably. For example, the terms unique cell coverage area 136.1 and unique cell 136.1 may be used interchangeably, the terms unique cell coverage area 136.2 and unique cell 136.2 may be used interchangeably, the terms unique cell coverage area 136.3 and unique cell 136.3 may be used interchangeably, and the terms shared cell coverage area 138 and shared cell 138 may be used interchangeably.

Each respective unique cell coverage area 136.1, 136.2, and 136.3 is provided by each respective RU 130.1, 130.2, and 130.3 in which each unique share cell coverage area provided by each respective RU is not shared with the other RUs. As such, each respective RU 130.1, 130.2, and 130.3 broadcasts a different cell identity (ID) (i.e., CGI such as E-CGI/NR-CGI) and PCI/NR-PCI for each respective unique cell coverage area 136.1, 136.2, and 136.3.

In contrast, shared cell coverage area 138 is provided by and shared among all RUs 130.1-130.3. Thus, all RUs 130.1, 130.2, and 130.3 may broadcast a same cell ID (E-CGI/NR-CGI) and PCI/NR-PCI for the shared cell coverage area 138.

Thus, in a hybrid cell deployment, such as shown for the disaggregated vRAN 120 of FIG. 1, RUs 130.1-130.3 can be configured as hybrid cells such that they can act like a single shared cell to serve one or more UEs 102 via shared cell coverage area 138 provided across all the RUs 130.1-130.3 and, further, each respective RU 130.1, 130.2, and 130.3 can also provide each of a respective unique cell coverage area 136.1, 136.2, and 136.3. Thus, each respective RU 130.1, 130.2, and 130.3 broadcasts a different cell identity (ID) (E-CGI/NR-CGI) and PCI/NR-PCI for each respective unique cell coverage area 136.1, 136.2, and 136.3 and all of RUs 130.1, 130.2, and 130.3 may broadcast a same cell ID (E-CGI/NR-CGI) and PCI/NR-PCI for the shared cell coverage area 138 that is also different from each respective unique cell E-CGI/NR-CGI and PCI/NR-PCI. The shared cell and the unique cells may share the same network identity, such as Public Land Mobile Network Identity (PLMN-ID).

As referred to herein, a unique cell may also be referred to interchangeably as a non-shared cell. Thus, the terms 'unique cell operating mode' and 'non-shared cell operating mode' can be used herein interchangeably. As shown in the embodiment of FIG. 1, three unique/non-shared cells and one shared cell are illustrated; however, it is to be understood that the example number of unique/non-shared cells and shared cells and/or the number of RUs forming a shared cell can be varied depending on implementation.

Further, it is to be understood that per-RU shared cells/coverage areas (which may be partially or wholly overlapping, as generally illustrated for unique cell coverage areas 136.1, 136.2, and 136.3), can also overlap the shared cell coverage area 138. Further, although illustrated as having no coverage gaps, in some instances RF gaps may be present for the shared cell coverage area 138. In some instances, an RU may support one or multiple shared cells. In some instances, multiple DUs and CUs may be present within system 100 in which each DU/CU can support one or more RUs also providing hybrid/non-hybrid cells. Thus, multiple shared cells can be present in system 100 in some instances. Further, the size and shape of the cells illustrated in FIG. 1 are provided for illustrative purposes only and are not meant to limit the broad scope of the embodiments discussed herein. Any size/shape of cell can be envisioned within the scope of embodiments discussed herein.

Additionally, although embodiments herein discuss that each RU 130.1, 130.2, and 130.3 operates in a hybrid configuration to provide unique and shared cell coverage areas, it is to be understood that one or more RUs for a vRAN implementation may operate in a non-hybrid mode by providing only unique cell or shared cell coverage. For example, in at least one embodiment, at least two of RUs 130.1, 130.2, and 130.3 may operate in the hybrid mode to provide both shared cell 138 and their corresponding unique cell, whereas the other of the at least two RUs may operate in a non-hybrid mode and may either provide only the shared cell 138 or only a corresponding unique cell.

Further, although UEs 102 are illustrated in FIG. 1 as being outside the coverage areas of the cells with which they are/can be connected, such illustration is provided for illustrative purposes only in order to discuss various feature of embodiments herein. It is to be understood that UEs 102 are/can be located within coverage areas of the cells with which they are connected as discussed for various embodiments herein.

In the hybrid configuration mode, the vRAN 120 resources are shared between the two modes for the shared cell 138 and each corresponding unique cell 136.1, 136.2, and 136.3 provided by RUs 130.1, 130.2, and 130.3 and the network can dynamically assign a shared cell operating mode to one class of UE devices and can assign a unique cell operating mode for another class of UE devices, based on, for example, UE type and/or enterprise policy utilizing operating mode information configured for the UE indicating the shared cell operating mode or the unique cell operating mode.

For example, in one instance, shared cell UEs 102.1 may be URLLC type devices that may be assigned to utilize a shared cell operating mode such that they may attach/connect to and be served by shared cell 138 for a service connection to mobile core network 110. During operation for shared cell UEs 102.1 utilizing the shared cell 138, no handovers may be involved as the shared cell UEs 102.1 may move across the RF range of each corresponding RU 130.1-130.3 and a replication of packets can be provided from all RUs 130.1-130.3 for transmissions involving shared cell UEs 102.1. For example, for uplink (UL) transmissions, the link-layer frames transmitted by shared cell UEs 102.1 may be received by more than one RU and multiple copies can be received by the DU 132. Any frames sent to a given shared cell UE 102.1 by the DU 132 can be transmitted from all or select RUs 130.1-130.3 of the shared cell 138, depending on beam resource policies that may be configured, as discussed in further detail below.

In another instance, unique cell UEs 102.2 may be eMBB type devices that may be assigned to utilize a unique cell operating mode such that they may be attached/connected to and be served by any one of unique cells 130.1, 130.2, or 130.3 for a service connection to mobile core network 110. During operation for unique cell UEs 102.2 utilizing a particular one of unique cells 130.1, 130.2, or 130.3, handovers can exist across the cells as the unique cell UEs 102.2 may across the coverage area of each unique cell and no packet replication may be provided by RUs 130.1-130.3 for transmissions involving unique cell UEs 102.2.

Consider various operational examples involving system 100. Broadly, operations involved in configuring and operating system 100 in the hybrid cell configuration mode for supporting shared cell and unique cell operating modes for UEs 102 can include the initial configuration of RUs 130.1, 130.2, and 130.3 via RAN-EMS 104, CU 134, and DU 132. It should be noted that while example operations discussed herein are provided with reference to URLLC and non-URLLC (e.g., eMBB) UE groups, any types or groups of UEs may be provisioned for operating in a shared cell operating mode or a unique cell operating mode in accordance with embodiments of the present disclosure. Thus, it can be envisioned that more than two groups of UEs can be provisioned with system 100 in various embodiments.

To facilitate the initial configuration of RUs 130.1, 130.2, and 130.3, the RAN-EMS 104 can be configured with a resource configuration for each operating mode, shared cell and unique cell, for each RU 130.1, 130.2, and 130.3 including, for example, operating frequency information (e.g., Frequency 1 and Frequency 2 can be unique cell frequencies and Frequency 3 can be a unique cell frequency), channel bandwidth (BW) information (e.g., Frequency 1 can have a bandwidth of 3550 to 3570 Megahertz (MHz)), NR-CGI and NR-PCI (for a 5G implementation), and the number of supported UEs. Resources provided via the resource configuration may also include the partition of Physical Resource Blocks (PRBs) that are to be utilized for shared cell and unique cell operations.

The RAN-EMS 104 also facilitates creation of a RU-DU enhanced Common Public Radio Interface (eCPRI) processing element endpoints for each RU-DU pair and notifies each RU 130.1, 130.2, 130.3 and the DU 132 regarding each corresponding RU-DU pairing. Generally, a processing element endpoint configuration for an RU-DU pair can include transport-based identifiers that define local and remote endpoints that are to be used for specific data flows between each RU and the DU to which each RU is assigned for a given RU-DU pair. Stated differently, a processing element endpoint may be considered a construct used to configure flows (that can be used for data flow transport, measurement operations, etc.) on the fronthaul interface between each RU and the DU with which each RU is assigned for a given RU-DU pair.

Thus, for the embodiment of FIG. 1, RU 130.1 can be paired to DU 132, RU 130.2 can be paired to DU 132, and RU 130.3 can be paired to DU 132 such that processing element endpoint configurations can be provided for each of RUs 130.1, 130.2, and 130.3 and also DU 132 for each RU-DU pair. In various embodiments, a processing element endpoint configuration, depending on the transport type/network connectivity (e.g., Ethernet, IP, etc.) between DU 132 and each RU 130.1, 130.2, and 130.3, may identify any of: different (alias) Media Access Control (MAC) addresses, virtual local area network (VLAN) identity and MAC addresses; and/or User Datagram Protocol (UDP) ports and IP addresses for the DU to which each RU is assigned. A particular processing element endpoint definition configured for a given RU/DU assignment can be provided a 'name' or other identifier that can be used by other systems, nodes, etc. (e.g., RAN-EMS 104) in order to tie UE 102 flows to DU 132.

It is to be understood that the vRAN 120 configuration as shown in FIG. 1 is provided for illustrative purposes only and is not meant to limit the broad scope of the present disclosure. In some instances, a CU can interface with multiple DUs and/or an RU can be paired with multiple DUs. Further, as noted above, in some instances additional CUs, DUs, and RUs can be present in vRAN 120 and can interface with/be paired with each other in any suitable configuration.

During operation, F1-Setup Request and Response signaling between DU 132 and CU 134 can be enhanced using an extension to contain operating mode for each cell ID (e.g., CGI/PCI) for each cell to be provided by each RU

130.1, 130.2, and 130.3. For example, DU 132 can identify an operating mode to CU 134 in an F1 Setup Request and the CU 134 can activate a corresponding cell for an RU to be operated in a shared cell mode or a unique cell mode.

Further, policies for classifying/assigning UEs 102 into UE groups based on UE type/application type can be provided for policy server 106 in order to group UEs into shared cell versus unique cell operating modes. TABLE 1, below, illustrates an example UE group to operating mode policy configuration including operating mode information that can be provided for policy server 106 in at least one embodiment.

TABLE 1

Example UE Group to Operating Mode Policy Configuration

| Group | Applications | Preferred Operating Mode |
| --- | --- | --- |
| Shared Cell UEs | URLLC, Latency Sensitive, TSN (e.g., AGV, AMR, TSN UETT) | Shared |
| Unique Cell UEs | eMBB, high throughput (e.g., smartphones, tablets, etc.) | Unique |

For example, as illustrated in TABLE 1, devices that involve URLLC, latency sensitive, and or time sensitive network (TSN) (e.g., Automated Guided Vehicles (AGVs), Autonomous Mobile Robots (AMRs), UE TSN Tunnel Translators (TTs), etc.), and/or the like applications/services can be grouped into a shared cell operating mode group of devices. Such devices may benefit from shared cell operating conditions (e.g., no handovers occur as they move across the coverage of RUs 130.1, 130.2, and 130.3). As further illustrated in TABLE 1, devices that do not involve URLLC, latency sensitive, TSN, etc. services/applications, such as eMBB devices, devices that may involve high throughput (e.g., smartphones, tablets, etc.), non-latency sensitive devices, and/or the like can be grouped separately into a unique cell operating mode group of devices. Such devices may not require shared cell operating conditions or it may be an inefficient use of network resources when these devices operate in shared cell.

UEs 102 can be grouped into shared cell or unique cell operating modes using any combination of UE types/identifiers and/or application types/identifiers (i.e., for applications operating on UEs) such as, for example, International Mobile Subscriber Identity (IMSI)/IMSI range(s) (e.g., groups of devices having IMSI within a certain range and/or range(s) of IMSI value(s)), International Mobile Equipment Identity (IMEI)/IMEI range(s), Subscription Permanent Identifier (SUPI)/SUPI range(s), Subscription Concealed Identifier (SUCI)/SUCI range(s), enterprise group identifier/range(s), security group tag (SGT)/range(s), application ID, application type (e.g., streaming video, voice, data type, etc.) device type (e.g., push-to-talk (PTT), etc.), and/or the like.

In still some embodiments, slice type/information with which a UE group may be associated may be used to determine the shared cell or unique cell operating mode based on the operating modes being associated with different network slices. In such embodiments, Single-Network Slice Selection Assistance Information (S-NSSAI)) and slice control functionality for the mobile core network 110 (e.g., a NSSF, etc. configured for mobile core network) can be used to control the association of UEs to slices and, hence, unique/shared cell resources.

In addition to operating mode information indicating a preferred operating mode, the policy server 106 can further be configured with UE beam resource policies permitting access to beam resources provided by RUs 130.1, 130.2, and 130.3. Generally, the allocation of a device to beam resources is used by the DU 132 when selecting which beams to use for serving a particular UE.

Generally, a beamformed system can use a plurality of antenna elements to adapt the composite antenna gain pattern generated by the antenna elements. The system can apply a set of amplitude and phase weights to the signals applied to individual antenna elements to direct the antenna main lobe pattern and/or side lobes and/or nulls towards specific azimuth and/or elevation angles. The use of specific azimuths and/or elevation angles can be used to beneficially direct radiated energy and receive energy to/from locations of specific user devices, in preference to other locations. Opportunistically, then serving a plurality of devices (e.g., UEs 102), the radiation pattern used to serve independent devices can generate a high degree of orthogonality between the channels used to serve individual devices. This allows multiple devices to be served simultaneously, using spatial multiplexing to simultaneously direct radiated energy towards a first device using a first set of antenna weights and towards a second device using a second set of antenna weights.

The individual channels are sensed using a system that monitors channel state information from individual devices. Channel information sensed from a plurality of devices, such as UEs 102, can be used to optimally select which devices to serve at a particular instance out of the total available set of devices. In a time-division duplex (TDD) system, the reciprocity of channel state information between the down-link and the up-link permits channel state information to be derived by examining received signals in the up-link and apply the derived information in determining the optimum antenna weights for operation in the down-link. In the 5G new radio (NR) system, sounding reference signals (SRS) are transmitted by a 5G device (e.g., a particular UE) and used to monitor the uplink channel state.

Beamforming offers benefits for devices where channel state is known. This means channel state for devices in the connected state can be continually updated and the composite beam pattern adapted accordingly. The periodicity of updates is limited by the period of updates to channel state information. In a TDD system, this may be limited by opportunities of devices in the connected state to send uplink information. Still in other frequency division duplex (FDD) systems, this may be limited by the periodicity of sending specific measurement reports that report information pertaining to the downlink channel state.

In certain environments, there will be a high degree of temporal correlation between successive estimation of channel state. Example of such environments can include when serving slow moving devices operated by pedestrian users. Being able to detect that channel state information exhibits a high temporal correlation allows the composite beams to be constructed with a high degree of directivity. Such beams are known as fine beams, where the elevation and/or azimuth arc is reduced to focus on a specific location. In other environments, there may be a low degree of temporal correlation between successive estimation of channel state. Examples of such environments can include when serving fast moving devices operated in a vehicular environment. Being able to detect that channel state information exhibits a low temporal correlation allows the composite beam to be constructed with a lower degree of directivity. Such beams are known as coarse beams, where the elevation and/or azimuth arc is increased to focus on a generalized location.

Whereas beamforming offers benefit to devices in the connected state, mobile systems it is useful to be able to transition devices from the idle state into the connected state. As channel state information is unknown for devices in the idle state, various operations may be involved to assist in the idle state to connected state transitioning procedure. These operations can include using procedures that avoid the use of beamforming during the initial attachment procedure. Such a beam is referred to a broadcast beam, where the elevation and/or azimuth arc is configured to cover the complete coverage area of a particular cell. Other operations include beam sweeping, where a coarse beam is swept across the entire elevation and/or azimuth arc that corresponds to the complete coverage area of a cell in discrete steps with devices configured to repeat their initial access procedures to ensure that a procedure will coincide with coverage of any device in the idle state in any location across a cell coverage area.

During initial attachment procedures, devices such as UEs 102 can make use of special signals transmitted in the downlink including the synchronization signal block (SSB) that includes the primary synchronization signal (PSS), the secondary synchronization signal (SSS), and the Channel State Information Reference Symbols (CSI-RS).

In a disaggregated radio access network, such as vRAN 120, beamformer logic is configured for each of RU 130.1, 130.2, and 130.3 and channel state information is determined during demodulation at the DU 132. The operation of the fronthaul network between the DU 132 and each of RU 130.1, 130.2, and 130.3 can be used to signal the information to enable the beamformer logic configured for each of RU 130.1, 130.2, and 130.3 to configure appropriate beam weights.

In one embodiment, the fronthaul interface between DU 132 and each of RU 130.1, 130.2, and 130.3 may be based on the Open RAN (O-RAN) Alliance open fronthaul specification, such as O-RAN.WG4.CUS.0-v05.00, published Nov. 7, 2020. In such an embodiment, upper PHY functionality in the DU 132 may include the modulation/demodulation, scrambling/de-scrambling and channel encoding/decoding functionality, with the remainder of the physical layer functions, sometimes referred to as the lower physical layer, implemented in each of RU 130.1, 130.2, and 130.3. In an open fronthaul implementation, frequency domain in-phase and quadrature information is signaled between the DU 132 and each of RU 130.1, 130.2, and 130.3.

In order to support beamforming, the open fronthaul system may support various beamforming techniques. In one embodiment, pre-defined beams can be defined in each respective RU 130.1, 130.2, and 130.3 and DU 132 for each respective unique cell 136.1, 136.2, and 136.3. Each beam may represent a set of weights and phases applied to the set of antenna elements for each RU and can be represented by a 15-bit beam identifier (beam-ID) in which a beam-ID of zero (0) may correspond to a broadcast beam and other beam-IDs may correspond to predefined antenna patterns. The information that defines the spatial relations between different non-broadcast beam-IDs can be signaled between each of RU 130.1, 130.2, and 130.3 and DU 132. In various embodiments, the information can include whether a beam-ID corresponds to a coarse beam or a fine beam, identification of specific neighboring beam-IDs, and/or identification of any overlapping beam-IDs.

During operation, beam-IDs for each of unique cells 136.1, 136.2, and 136.3 can be signaled in messages sent between the DU 132 and each respective RU 130.1, 130.2, and 130.3 pertaining to each respective unique cell 136.1, 136.2, and 136.3. In the downlink, for example, a beam-ID can be signaled along with frequency domain in-phase and quadrature symbols to a given RU and can be used by the given RU to configure antenna weights when transmitting the corresponding symbols to a given UE. In the uplink, a beam-ID can be signaled in control plane messages that configure the lower physical layer and can be received by a given RU and used to configure the antenna weights when receiving the corresponding symbols from uplink transmissions obtained from a given UE.

In a shared cell, such as shared cell 138, frequency domain in-phase and quadrature symbols can be signaled to each of RUs 130.1, 130.2, and 130.3 which then simultaneously transmit the same information. In the uplink for shared cell 138, common control plane messages are sent to each pf RU 130.1, 130.2, and 130.3 to configure the lower physical layer to simultaneously receive a set of symbols and signal such symbols to DU 132. Thus, it is to be understood that if a beam-ID of zero (0) is used in the signaling, then each of the plurality of RUs 130.1, 130.2, and 130.3 will use their corresponding broadcast beams for the operation of the shared cell 138. As an optimization in at least one embodiment, the beam space corresponding to a 15-bit beam-ID can be partitioned between individual RUs 130.1, 130.2, and 130.3. In such an embodiment, the beamforming RUs 130.1, 130.2, and 130.3 can effectively be operated as a single distributed multi-antenna system.

In contrast to a single RU system in which an RU is able to signal a DU information regarding the relationships between beam-IDs, in a distributed system as provided via vRAN 120 such information may be determined based on the spatial relationships between RU 130.1, 130.2, and 130.3 and, hence, may not be known a priori by an RU. Rather, the DU 132 can use frequency domain in-phase and quadrature symbols received from the RUs 130.1, 130.2, and 130.3 to determine the effective beam relations.

In one embodiment, the DU 132 can signal the individual RUs 130.1, 130.2, and 130.3 with information of which beam-ID may be used for an additional broadcast beam. For example, DU 132 may configure the RU 130.1 to use a beam-ID 1 as an additional broadcast beam, may configure the RU 130.2 to use a beam-ID 2 as an additional broadcast beam, and may configure the RU 130.3 to use beam-ID 3 as an additional broadcast beam. On initialization, DU 132 may not know the relations between beam-ID 1, beam-ID 2 and beam-ID 3. When serving a particular shared cell UE 102.1, for example, the DU 132 can configure beam-ID 1, beam-ID 2 and beam-ID 3 to simultaneously serve the uplink reception from the particular shared cell UE 102.1 and DU 132 can receive corresponding frequency domain in-phase and quadrature symbols from RU 130.1, 130.2, and 130.3. By processing these signals, DU 132 can determine the signal quality of the symbols received by the different RUs 130.1, 130.2, and 130.3 for uplink transmissions by a given shared cell UE 102.1. For example, this processing can indicate that while RU 130.3 may receive the best quality signal from the given shared cell UE 102.1, RU 130.2 may receive the second best quality. The DU 132 can therefore determine that there is a spatial beam relationship between beam-ID 3 on RU 130.3 and beam-ID 2 on RU 130.2.

After such a period of determination, DU 132 can flexibly configure the RUs 130.1, 130.2, and 130.3 to operate in a range of configurations. Using beam-ID 0, for example, the DU 132 can operate using shared cell 138 where all RUs 130.1, 130.2, and 130.3 are used to simultaneously to serve a given shared cell UE 102.1. In another example, using beam-ID 1, beam-ID 2, or beam-ID 3, the DU 132 can operate using a broadcast from a particular RU to serve a shared cell UE 102.1. In yet another example, using a combination of beam-ID 1 and beam-ID 2, using a combination of beam-ID 1 and beam-ID 3, or using a combination of beam-ID 2 and beam-ID 3, the DU 132 can operate using a distributed beamforming system from a plurality of RU 130.1, 130.2, and/or 130.3 to serve a given shared cell UE 102.1.

Accordingly, for the beam resource policies configured for policy server 106, UEs that are to access a URLLC application, such as shared cell UEs 102.1, can be configured with a policy that enables access to broadcast beam resources. Further, UEs that are to access non-real-time IoT applications can be configured with a policy that enables access to single beam resources. Further, UEs that are determined to be highly mobile may be configured with a policy that enables access to coarse beam resources. Still further, UEs that are determined to be semi-static/slowly moving may be configured with a policy that enables access to fine beam resources.

In a shared RU configuration, such beam resource policies can help to ensure that a device using a URLLC application is served using a shared cell that operates using broadcast beam resources, originating from overlapping RUs, thus, ensuring the most consistent service across the service area. Further, other devices using IoT applications can be served using single beam-IDs originating from a single RU, thus ensuring optimized use of frequency resources.

Following vRAN 120 configuration and operating mode/beam resource configuration, UEs 102 can be configured for a corresponding operating mode in order to facilitate attachment/service connection of UEs 102 to an RU/cell of the vRAN 120. In various embodiments, operating mode configuration can be performed during UE registration and/or through UE configuration prior to UE registration.

In one embodiment, for example, a given UE 102 may connect to any cell during initial cell-selection procedure to perform a UE RRC setup/registration procedure. In this embodiment, a given UE 102 may select any initial cell and begin the RRC setup/registration procedure and the network, via AMF 112), can assist in moving the UE 102 to its preferred operating mode based on the operating mode and beam resource policy configuration configured for the UE group to which the given UE 102 belongs. TABLE 2, below, illustrates example operating mode selection details for UE initial cell selection at attachment and following RRC reconfiguration.

TABLE 2

Example Operating Mode Selection Involving UE Registration

| Group | Attach Starts At | After RRC Reconfiguration |
| --- | --- | --- |
| Shared Cell UEs | Shared | Shared |
|  | Unique | Shared |
| Unique Cell UEs | Shared | Unique |
|  | Unique | Unique |

During operation for this embodiment following completion of the 5G authentication procedure for the given UE 102, the AMF 112, based on the operating mode/beam resource policies for the given UE 102 obtained via policy server 106 or an AAA/PCF/PCRF/UDM, in some embodiments, can send the corresponding RAN cell operating mode to the given UE 102 device to facilitate attachment/service connection of the given UE to an RU/cell of the vRAN 120. In various embodiments, sending the cell operating mode to a UE can include repurposing the RAT/Frequency Selection Priority (RFSP) index in Ng Application protocol (NgAP) signaling or through a new Information Element (IE) being sent to the UE that indicates the operating mode assigned to the UE. For example, using the RFSP, a first integer 'X' could be mapped to indicate a shared cell operating mode and a second integer 'Y' could be mapped to indicate a unique cell operating mode. Similarly, using a new IE, a first bit, flag, integer, etc. could be mapped to indicate a shared cell operating mode and a second bit, flag, integer, etc. could be mapped to indicate a unique cell operating mode.

The CU 134 can leverage a repurposed RFSP index or a new IE to mark or otherwise map/store an indication for a given UE 102 as belonging to a shared cell versus a unique cell, as well as to identify beam resources for the given UE 102. The CU 134 can initiate steps to assist the given UE 102 to move to the best suited cell if the UE chose to initiate attachment/service connection to another cell type that differs from the type corresponding to the preferred operating mode for the UE. In one embodiment, the CU 134 is operational to configure the DU 132 and a given RU with different beams. The configuration of each beam in the DU includes the synchronization signals and reference signals. The configuration of each beam in the DU 132 and a given RU can include allocation of a specific beam-ID. The CU 134 is operational to configure measurements for a given UE 102 that correspond to the synchronization and/or reference signals in the individual beams. The given UE 102 can report results of performed measurements to the CU 134 to then allow the identification of beam resources for the given UE 102.

The CU 134 can assist in moving UEs belonging to the shared cell group to the shared cell 138 for an RU if the initial RRC setup/attachment was to a unique cell (e.g., due to cell search logic for the UE). In this regard, an RRC Reconfiguration (RRCReconfig) procedure can be initiated by the CU 134 for the given UE 102 to move its attachment/service connection to an "other cell" on same a RU (e.g., move between shared cell and a unique cell for the RU). Optionally, this step may be skipped if UEs may be configured with a preferred operating mode according to Subscriber Identification Module (SIM) attributes that can be configured for UEs, meaning that the UE, based on configuration of a SIM profile identifying an operating mode configured for the UE, the UE will operate in that configuration mode by attaching to a shared or unique cell and operate in those frequencies.

In some embodiments, a special configuration can be provided to the group of shared cell UEs such that they may begin network join operations (e.g., cell-search) only through the shared cell 138. In one instance, this may be implemented by configuring the UEs belonging to the shared cell group with a set of frequencies operating in the shared cell 138 (e.g., for the UEs to scan those frequencies and operate in the shared cell mode). In one instance, configuration may be provided via SIM-based parameters. For example, SIM attributes for shared cell (e.g., URLLC type) UEs 102.1 can be configured to indicate a preference for shared cell frequency selection, whereas SIM attributes for unique cell (e.g., non-URLLC type) UEs 102.2 can indicate a preference for unique cell frequency selection.

In still some instances, such attributes/frequencies can be updated through over-the-air (OTA) mechanisms, such as using the Global System for Mobile Communications Association (GSMA) remote SIM provisioning interface In still some instances, RUs 130.1, 130.2, and 130.3 can advertise their operating mode(s) (e.g., a cell ID along with a shared cell or unique cell operating mode indication for each cell type provided by the RU) in a System Information Block (SIB), which may allow each UE 102 to select a network supporting the specific operating mode provided in the SIM configuration for each UE 102 (e.g., shared cell operating mode or unique cell operating mode). In such instances, the network can maintain the option to enforce techniques involving the approaches for moving UEs to a preferred operating mode if operating mode and/or beam resource policies are updated in the network (e.g., at policy server 106).

To facilitate service connection of a given UE to the preferred cell type (shared or unique) for vRAN 120, vRAN 120/DU 132 operation can be provided such that the DU 132 can be enhanced with logic to provide concurrent scheduling between the shared cell operating mode UEs 102.1 and the unique cell operating mode UEs 102.2 such that scheduling can be provided for shared cell UEs 102.1 that are connected to the mobile core network 110 via the shared cell 138 of vRAN 120, as illustrated via dashed-line arrows in FIG. 1 for the shared cell group of UEs 102.1, and scheduling can also be provided for unique cell UEs 102.2 that are connected to the mobile core network 110 via one of the unique cells 136.1, 136.2, or 136.3 of vRAN 120, as also illustrated via dashed-line arrows in FIG. 1 for the unique cell group of UEs 102.2. For the shared cell operating mode UEs 102.1, the DU 132 can perform combine and copy functions during receive (Rx) (uplink transmissions received from a UE) and transmit (Tx) (downlink transmissions to a UE) operations, respectively, for multiple RUs 130.1, 130.2, and 130.3 for a given scheduling slot. For example, an uplink frame received from multiple sources can be combined into a single copy, which can help in fixing errors in the received frame, etc. For downlink, a frame received from the core network can be replicated and sent over multiple radios. For the unique cell operating mode UEs 102.2, the DU 132 can schedule Tx and Rx slots for each RU 130.1, 130.2, and 130.3 independently. Thus, the vRAN 120 can be operated in to modes concurrently and independent from each other such that a given UE 102 operating in a preferred operating mode can be served in that context by the vRAN 120.

Accordingly, system 100 can facilitate the auto-configuration of hybrid cells supporting shared cell and unique cell operating modes for UEs in a vRAN architecture, such as vRAN 120.

Additional operations details are discussed with reference to FIGS. 2A-2C, discussed below. In particular, FIGS. 2A, 2B, and 2C are a message sequence diagram illustrating a call flow 200 associated with the auto-configuration of a hybrid cell and supporting a shared cell or a unique cell operating mode for a UE, according to an example embodiment.

Figure 2A:
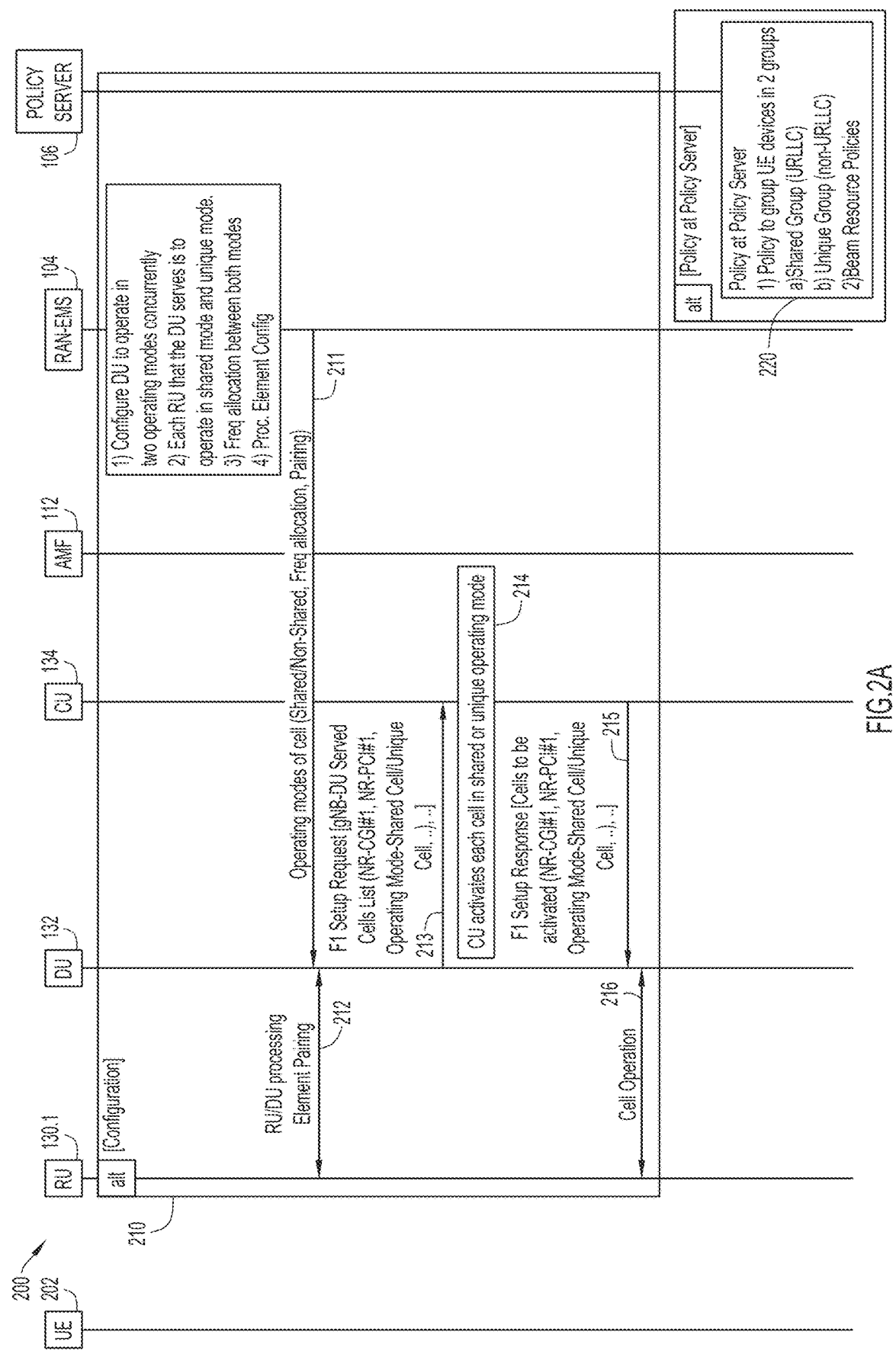
FIGS. 2A, 2B, and 2C are a message sequence diagram illustrating a call flow associated with the auto-configuration of a hybrid cell and supporting a shared cell or a unique cell operating mode for a user equipment, according to an example embodiment.
Figure 2B:
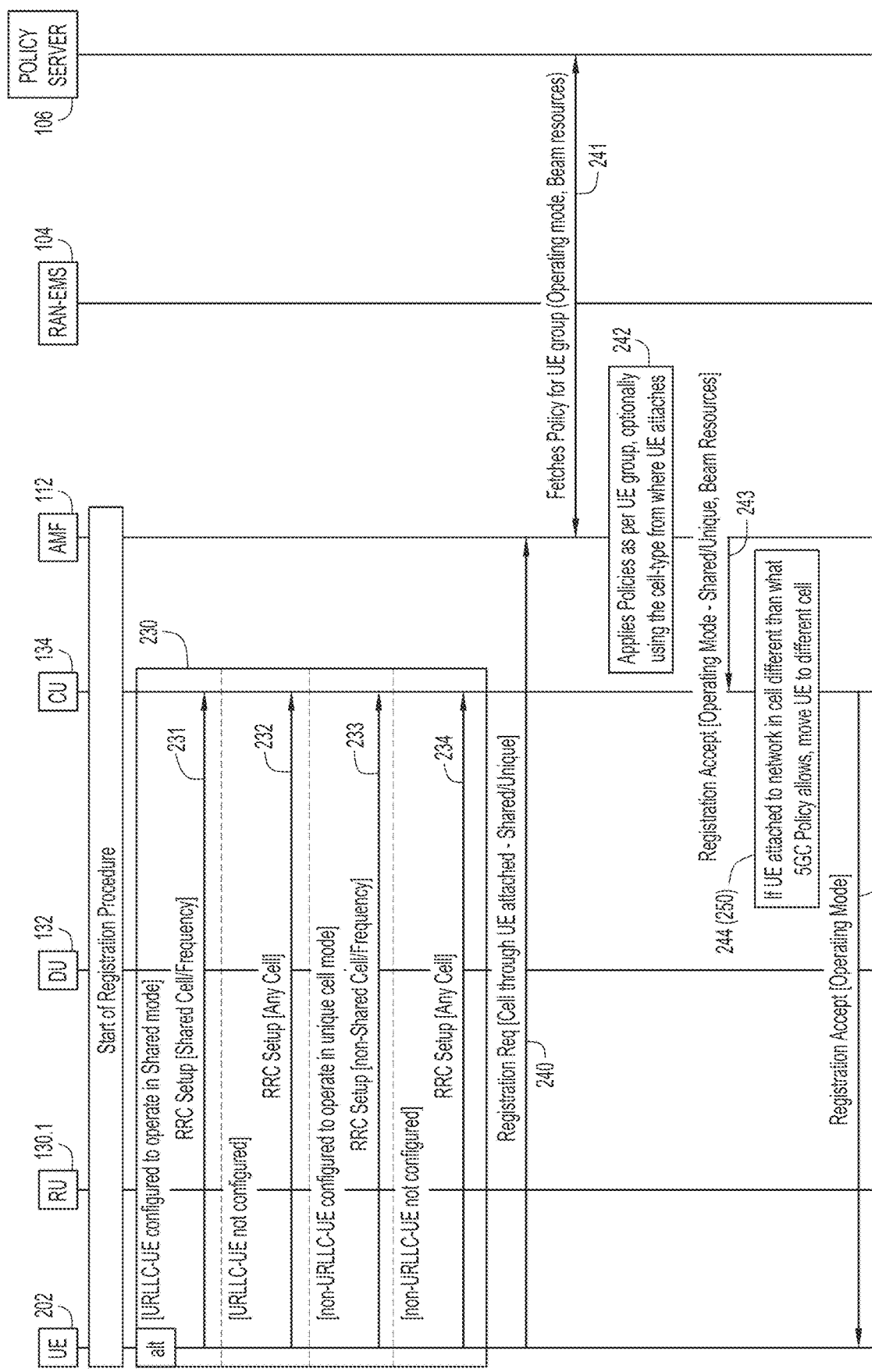
Figure 2C:
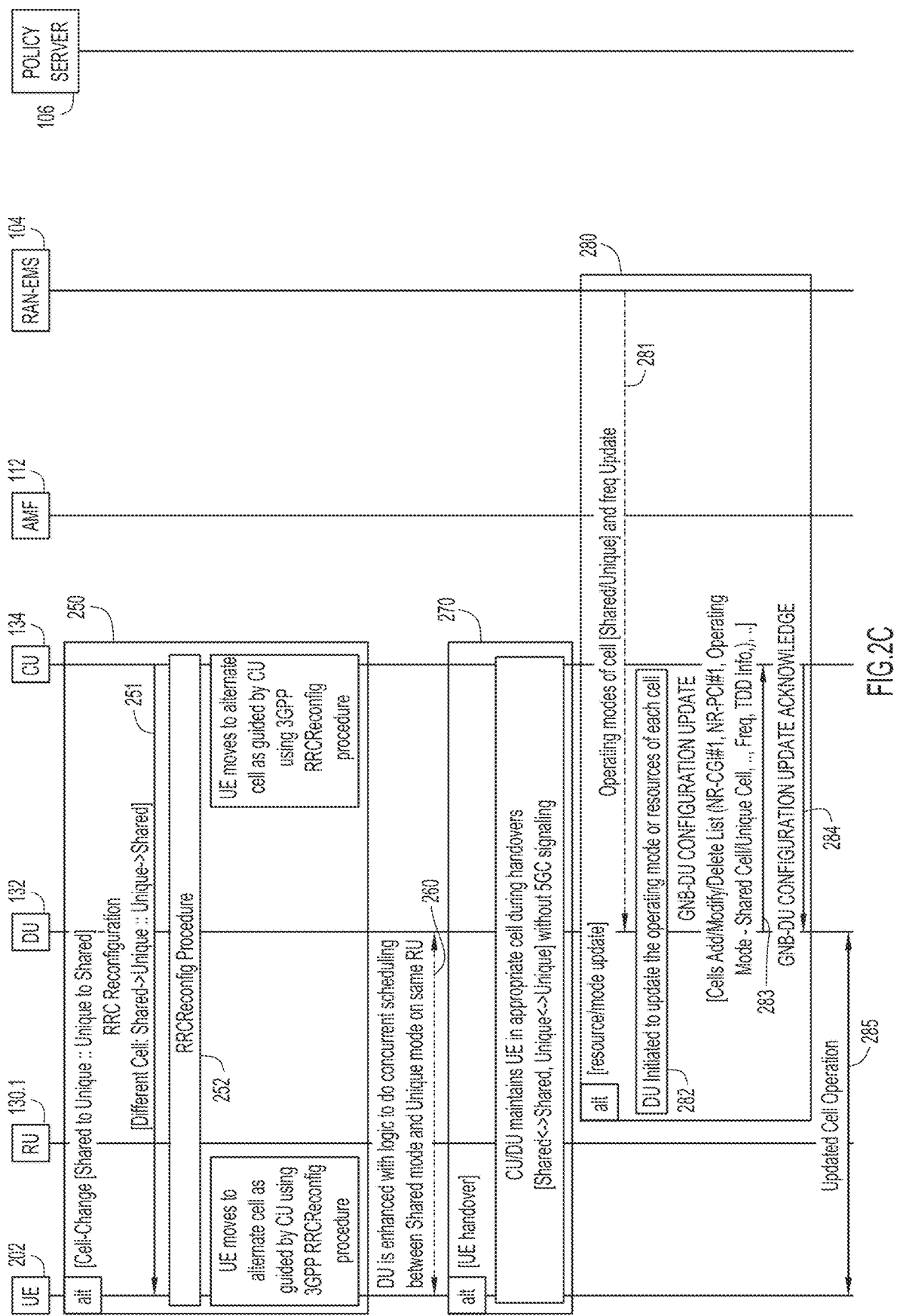

Referring to FIGS. 2A, 2B, and 2C, FIGS. 2A, 2B, and 2C include RU 130.1, DU 132, CU 134, AMF 112, RAN-EMS 104, and policy server 106 of system 100 of FIG. 1. Also shown in FIGS. 2A, 2B, and 2C is a UE 202. In various embodiments, UE 202 can be any UE belonging to either a shared cell group of UEs or a unique cell group of UEs. Although only RU 130.1 is illustrated in FIGS. 2A-2C, it is to be understood that operations discussed for call flow 200 can also be performed for RU 130.2 and RU 130.3 of system 100. Further, although FIGS. 2A, 2B, and 2C are discussed with reference to URLLC and non-URLLC groups, this discussion is provided for illustrative purposes only. It is to be understood that any types or groups of UEs can be configured to utilize a shared cell operating mode or a unique cell operating mode for a vRAN hybrid cell architecture, such as vRAN 120.

At 210, initial configuration operations can be performed in order to activate unique cell 136.1 and shared cell 138 for RU 130.1. For operations 210, DU 132 can be configured via RAN-EMS 104 to operate in two operating modes (shared cell and unique cell operating modes) concurrently in which each of RU 130.1, 130.2, and 130.3 that DU 132 serves can be configured to operate concurrently in a shared cell mode and a unique cell mode to provide both a unique cell and the shared cell (note, RU 130.2 and 130.3 are not illustrated in FIGS. 2A-2C), and a frequency allocation along with cell ID (e.g., E-CGI/NR-CGI) and PCI (e.g., E-PCI/NR-PCI) can be provided between both modes. Further, processing element endpoint configuration information can be provided for each RU-DU pairing.

For example, at 211 consider that RAN-EMS 104 provides to DU 132 the operating modes of the unique cell 136.1 and the shared cell 138 to be operated by RU 130.1, the frequency allocation along with cell ID (e.g., E-CGI/NR-CGI) and PCI (e.g., E-PCI/NR-PCI) for each cell, and pairing information for the processing element endpoint configuration for each of RU 130.1 and DU 132 for the RU 130.1-DU 132 pairing. For the present example, consider that unique cell 136.1 is associated with a first NR-CGI (NR-CGI#1) and a first NR-PCI (NR-PCI#1) and that shared cell 138 is associated with a second NR-CGI (NR-CGI#2) and a second NR-PCI (NR-PCI#2). Other resource information can be provided by RAN-EMS 104 to DU 132 in accordance with various embodiments described herein.

At 212, the processing element endpoints are configured for each of RU 130.1 and DU 132. At 213, DU 132 communicates an F1 Setup Request message to CU 134 including the NR-CGI and NR-PCI information for each cell to be provided by RU 130.1. For example, an extension can be provided for the F1-Setup Request that that includes a gNB-DU Served Cells List that identifies configuration information for each cell along with an indicator indicating whether a corresponding cell is to be operated in a shared cell operating mode or a unique cell operating mode (e.g., F1 Setup Request [gNB-DU Served Cells List(NR-CGI#1, NR-PCI#1, Operating Mode: Unique Cell), (NR-CGI#2, NR-PCI#2, Operating Mode: Shared Cell), in this example], as shown at 213). At 214, CU 134 activates each cell in a shared or unique operating mode by communicating an F1 Setup Response message to DU 132 at 215 including a list of cells to be activated along with an indicator indicating whether a corresponding cell is to be operated in a shared cell operating mode or a unique cell operating mode (e.g., F1 Setup Response [Cells to be Activated(NR-CGI#1, NR-PCI#1, Operating Mode: Unique Cell), (NR-CGI#2, NR-PCI#2, Operating Mode: Shared Cell)]. At 216, DU 132 facilitates operation of the unique cell 136.1 and the shared cell 138 provided by RU 130.1 such that RU 130.1 broadcasts NR-CGI#1 and NR-PCI#1 for unique cell 136.1 and can broadcast NR-CGI#2 and NR-PCI#2 for shared cell 138 as operated by DU 132. Similar operations can be performed for RU 130.2 and RU 130.3 in accordance with embodiments herein.

At 220 as shown in FIG. 2A, consider further that policy server 106 is configured with policy information such as an operating mode policy configuration in order to group UEs into two operating mode groups such that a first group of UEs (e.g., URLLC type UEs) can be identified as belonging to a shared cell group of UEs and a second group of UEs (e.g., non-URLLC type UEs) may be identified as belong to a non-shared or unique cell group of UEs. In one embodiment, the operating mode policy configuration can be configured as shown in TABLE 1.

In at least one embodiment at 220, policy server 106 can be configured with additional policy information including a beam resource policy configuration that identifies beam resources for different groups of UEs. For example, UEs that are to operate in a shared cell operating mode (e.g., for accessing a URLLC application) can be configured with a policy that enables access to broadcast beam resources. Further, UEs that are to operate in a unique cell operating mode (e.g., to access non-real-time IoT applications) can be configured with a policy that enables access to single beam resources. Further, UEs that are determined to be highly mobile may be configured with a policy that enables access to coarse beam resources. Still further, UEs that are determined to be semi-static/slowly moving may be configured with a policy that enables access to fine beam resources.

In various embodiments, the operating mode and beam resource policy information configured for policy server 106 can include UE identifying information (e.g., IMSI, IMEI, etc.) in order to identify the corresponding operating mode and beam resource policy information for UE 202. In some embodiments, operating mode and/or beam resource policy configuration information can be configured for an authentication function, such as an AAA/PCF/PCRF/HSS/UDM/ etc., which can be obtained by the AMF 112 during UE authentication or by requesting a policy function after authentication.

Continuing to FIG. 2B, consider that UE 202 can start a registration procedure in order to facilitate a connection between UE 202 and mobile core network 110. As shown at 230, UE 202 can initiate an RRC setup with CU 134 via RU 130.1 and DU 132 using a variety of techniques. For example, if UE 202 is a URLLC UE configured to operate in a shared cell operating mode (e.g., via a SIM provided configuration), as shown at 231, UE 202 can communicate an RRC Setup message to CU 134 via shared cell 138 provided by RU 130.1. In another example, if UE 202 is a URLLC UE that is not configured to operate in a particular operating mode, as shown at 232, UE 202 can an RRC Setup message to CU 134 via any of shared cell 138 or unique cell 136.1 provided by RU 130.1. In another example, if UE 202 is a non-URLLC UE that is configured to operate in a unique cell operating mode (e.g., via a SIM provided configuration), as shown at 233, UE 202 can communicate an RRC Setup message to CU 134 via unique cell 136.1 provided by RU 130.1. In yet another example, if UE 202 is a non-URLLC UE that is not configured to operate in a particular operating mode, as shown at 234, UE 202 can an RRC Setup message to CU 134 via any of shared cell 138 or unique cell 130.1 provided by RU 130.1. Thus, UE 202 can initiate the registration procedure via any cell type.

Continuing to 240, CU 134 communicates a registration request for UE 202 (obtained from UE 202 through the cell through which UE 202 is attached) to AMF 112. At 241, AMF 112 obtains policy information from policy server 106 for UE 202 based on the group to which UE 202 belongs, including operating mode policy information (e.g., identifying a shared cell operating mode or a unique cell operating mode for UE 202) and beam resource information (e.g., as configured at 220). In various embodiments, the policy information can be obtained based on UE 202 identifying information (e.g., IMSI, IMEI, etc.) communicated to policy server 106 by AMF 112. UE 202 authentication is not illustrated in FIG. 2A, however, it is assumed that AMF 112 also authenticates UE 202 for access authentication to the network, per standards-based 3GPP operations. In some embodiments, as discussed above, the operating mode and/or beam resource policies for a UE belonging to a UE group can be obtained from an authentication function (e.g., AAA/PCF/PCRF/HSS/UDM/etc.) by the AMF 112 during UE access authentication or from a policy function after authentication.

At 242, based on successful authentication for UE 202, AMF 112 applies the policies to UE 202 per the UE group, optionally using the cell type through which the UE 202 attaches to the network (e.g., if the UE is a shared cell UE and registration is through a shared cell, such awareness at the AMF 112 can allow any other policy configuration at the AMF for the UE specific to that operating mode). At 243, AMF 112 communicates a registration accept to CU 134 indicating the shared cell or unique cell operating mode for UE 202 and beam resources to be utilized by UE 202 in order to facilitate service connection of the UE to one of the shared cell or the unique cell of RU 130.1. At 244, CU 134 can determine if UE 202 is attached to the mobile core network 110 via a cell that is different than the cell type for the operating mode policy for the UE. If the UE 202 is attached to the mobile core network 110 via a cell that is different than the cell type for the operating mode policy for the UE, the CU 134 can switch the operating mode of UE 202 in order to move UE 202 to a different cell, as shown at 250, discussed in further detail below. At 245, CU 134 communicates a registration accept to UE 202 that identifies/provides an indication of the operating mode for the UE 202 (e.g., shared cell operating mode or unique cell operating mode), which can be identified using any of an IE, flag, bit, and/or the like. In some embodiments, beam resources and/or any other cell parameters that the UE 202 is to utilize for the operating mode can also be identified to the UE at 245.

Continuing to FIG. 2C, operations 250 may be performed if UE 202 is to be switched to a different operating mode/ moved to a different cell than the cell through which the UE initiated the registration procedure with the network. For example, based on determining at 244 that the UE 202 is attached to the mobile core network 110 via a cell that is different than the cell type for the operating mode policy for the UE, the CU 134 can communicate an RRC Reconfiguration message to UE 202 at 251 that includes an indication that the UE 202 is to perform a cell change to a different type of cell (e.g., from shared to unique or (represented by '::') from unique to shared), thereby switching the operating mode for UE 202. At 252, an RRC reconfiguration procedure is performed between UE 202 and CU 134, as prescribed at least by 3GPP Technical Specification (TS) 38.331, in order to move UE 202 to the preferred cell type, as guided by CU 134.

As shown at 260, DU 132 is enhanced with logic to provide concurrent scheduling between the shared cell operating mode UEs (e.g., UE 202, if configured as a shared cell UE, and shared cell UEs 102.1 as shown in FIG. 1) and the unique cell operating mode UEs (e.g., UE 202, if configured as a unique cell UE, and unique cell UEs 102.2, as shown in FIG. 1) such that scheduling can be provided for UEs that are connected to the mobile core network 110 via the shared cell 138 of vRAN 120 and UEs that are connected to the mobile core network 110 via one of the unique cells 136.1, 136.2, or 136.3 of vRAN 120, such as unique cell 136.1 provided by RU 130.1 for the embodiment of FIGS. 2A-2C.

As shown at 270, UE handover operations can be performed via CU 134/DU 132 in which the UE 202 is maintained in an appropriate cell type (e.g., shared to shared or unique to unique) without additional 5GC signaling with mobile core network 110.

In some instances, as shown at 280, resource and/or operating mode updates may be provided for more or more cells provided by one or more of RUs 130.1, 130.2, and/or 130.3. For example, as new UEs register and are assigned to a shared cell or unique cell, RAN-EMS 104 can monitor RAN resource utilization between the two modes. Thus, RAN-EMS 104 can be enhanced with an ability to dynamically update RAN resources and/or operating modes of RUs between the two modes, as shown at 281, based on resource utilization spikes in one of the operating modes, in one example.

At 282, DU 132 is initiated to update the operating mode and/or resources of each cell by sending a gNB-DU Configuration Update message to CU 134 as shown at 283 that can include any updated information such as adding, modifying, and/or deleting operating modes for RUs for one or more cells, updating frequency information for one or more cells, time domain duplex (TDD) information for one or more cells, combinations thereof, and/or the like. CU 134 can respond with a gNB-DU Configuration Update acknowledgment, as shown at 284. At 285, the one or more cell(s) are operated by DU 132 via RU 130.1 (and/or RU 130.2/130.3, if applicable). Such operations as illustrated at 280 can result in modification (increases/decreases) to the channel bandwidth allocated between shared cell and unique cell modes as the number of devices transitioning to the shared cell and/or a unique cell increases/decreases, in one example. Such modifications can be performed for other purposes.

Figure 3:
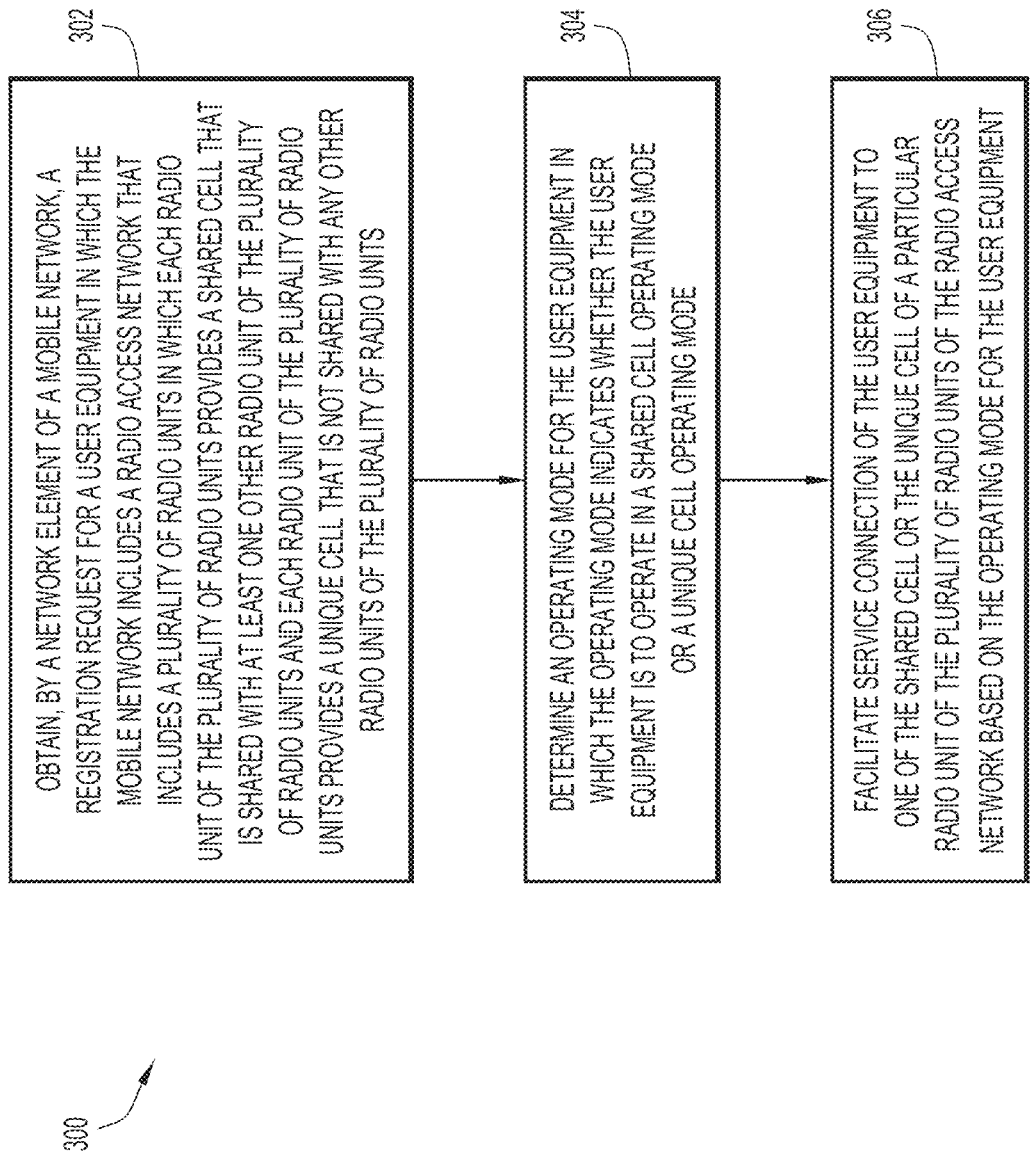
FIG. 3 is a flow chart depicting a method according to an example embodiment.

Referring to FIG. 3, FIG. 3 is a flow chart depicting a method 300 according to an example embodiment. In at least one embodiment, method 300 illustrates example operations that may be performed, at least in part, by an AMF, such as AMF 112, in order to support a shared cell or a unique cell operating mode for a user equipment, according to an example embodiment. Example operations depicted for method 300 can be performed in conjunction with one or more elements of a vRAN, such as RAN-EMS 104, CU 134, DU 132, and a given RU (e.g., any of RU 130.1, 130.2, or 130.3).

Consider, at 302 that the method may include obtaining, by a network element of a mobile network (e.g., AMF 112 of mobile core network 110), a registration request for a user equipment (e.g., any UE 102) in which the mobile network includes a radio access network (e.g., vRAN 120) that includes a plurality of radio units in which each radio unit of the plurality of radio units provides a shared cell that is shared with at least one other radio unit of the plurality of radio units and each radio unit of the plurality of radio units provides a unique cell that is not shared with any other radio units of the plurality of radio units.

At 304, the method may include determining an operating mode for the user equipment in which the operating mode indicates whether the user equipment is to operate in a shared cell operating mode or a unique cell operating mode.

In one instance the method may further include configuring policy (e.g., via policy server 106) with operating mode information that indicates a first group of user equipment that are to operate in the shared cell operating mode and that indicates a second group of user equipment that are to operate in the unique cell operating mode. In one instance, the first group of user equipment are latency sensitive user equipment and the second group of user equipment are non-latency sensitive user equipment. In one instance, determining the operating mode for the user equipment may further include determining a group to which the user equipment belongs based on the operating mode information configured for the policy server; and determining whether the user equipment is to operate in the shared cell operating mode or the unique cell operating mode based on the group to which the user equipment belongs.

In some instances, the method can further include configuring the policy with beam resource information indicating first beam resources that can be utilized by the first group of user equipment and second beam resources that can be utilized by the second group of user equipment. In some instances, the first beam resources are associated with broadcast beam resources for the first group of user equipment and the second beam resources are associated with single beam resources.

At 306, the method may include facilitating service connection of the user equipment to one of the shared cell or the unique cell of a particular radio unit of the plurality of radio units of the radio access network based on the operating mode for the user equipment. In some instances, facilitating the service connection of the user equipment may include switching the operating mode of the user equipment, by a CU, such as CU 134, between the shared cell operating mode and the unique operating cell mode.

Other operations may be performed in accordance with techniques herein. For example, in one instance the method may further include, prior to obtaining the registration request for the user equipment configuring (e.g., via RAN-EMS 104, CU 134, DU 132, and one or more of RUs 130.1, 130.2, and 130.3) each radio unit of the plurality of radio units with one CGI and one PCI in which the one CGI and the one PCI are shared by each radio unit of the plurality of radio units for providing the shared cell. The method may further include configuring each radio unit of the plurality of radio units with a unique CGI and a unique PCI in which each unique CGI and each unique PCI configured for each radio unit is not shared by another radio unit for providing each unique cell. In some instances the method may further include updating the cell resources and/or the operating mode for one or more cells provided by one or more radio units.

Figure 4:
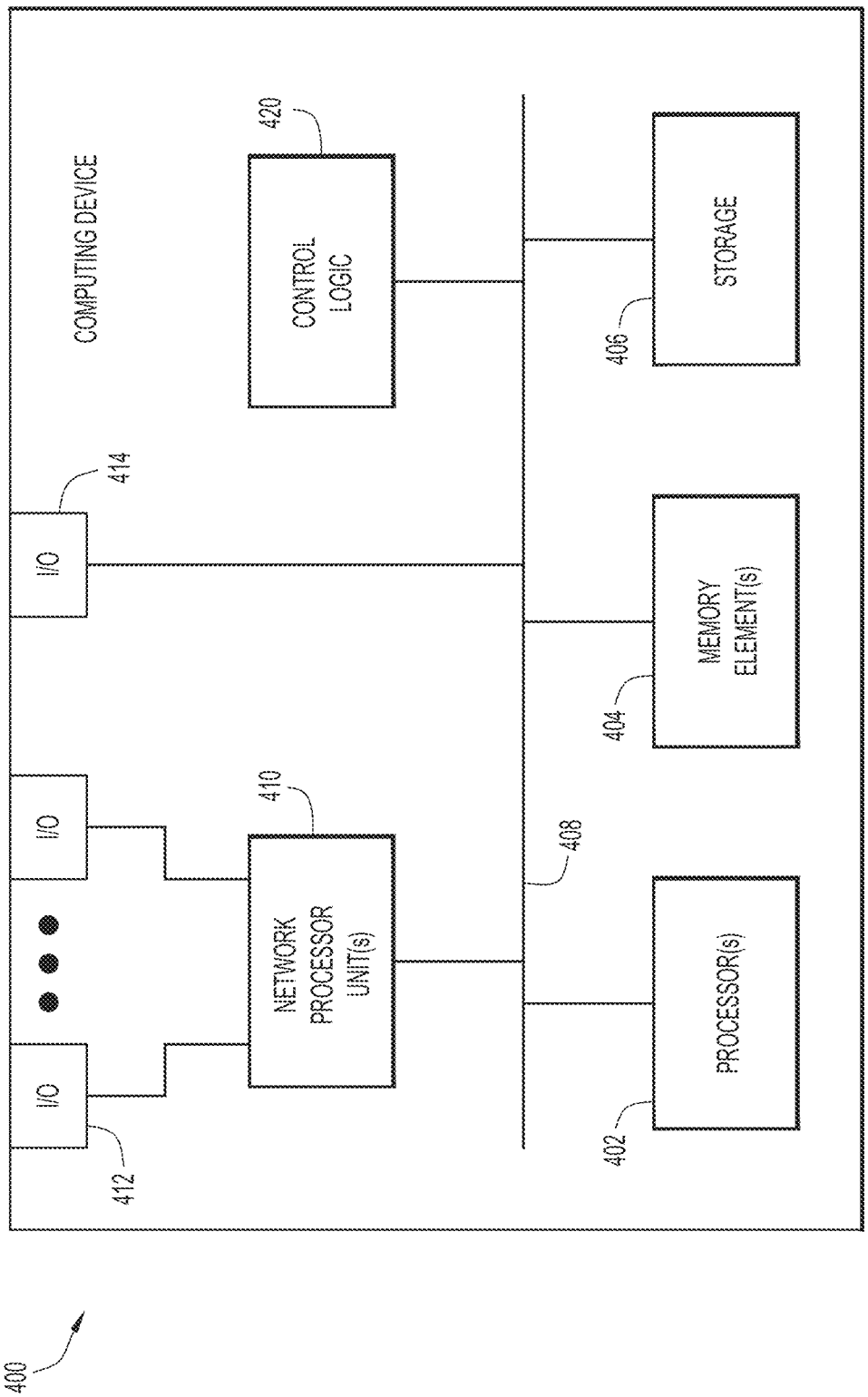
FIG. 4 is a hardware block diagram of a computing device that may perform functions associated with any combination of operations, in connection with the techniques discussed herein.

Referring to FIG. 4, FIG. 4 illustrates a hardware block diagram of a computing device 400 that may perform functions associated with operations discussed herein. In various embodiments, a computing device or apparatus, such as computing device 400 or any combination of computing devices 400, may be configured as any entity/entities as discussed herein in order to perform operations of the various techniques discussed herein, such as, for example, any of AMF 112, SMF 114, RAN-EMS 104, CU 134, DU 132, and/or any other network element discussed for embodiments herein.

In at least one embodiment, computing device 400 may be any apparatus that may include one or more processor(s) 402, one or more memory element(s) 404, storage 406, a bus 408, one or more network processor unit(s) 410 interconnected with one or more network input/output (I/O) interface(s) 412, one or more I/O interface(s) 414, and control logic 420. In various embodiments, instructions associated with logic for computing device 400 can overlap in any manner and are not limited to the specific allocation of instructions and/or operations described herein.

In at least one embodiment, processor(s) 402 is/are at least one hardware processor configured to execute various tasks, operations and/or functions for computing device 400 as described herein according to software and/or instructions configured for computing device. Processor(s) 402 (e.g., hardware processor(s)) can execute any type of instructions associated with data to achieve the operations detailed herein. In one example, processor(s) 402 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 404 and/or storage 406 is/are configured to store data, information, software, and/or instructions associated with computing device 400, and/or logic configured for memory element(s) 404 and/or storage 406. For example, any logic described herein (e.g., control logic 420) can, in various embodiments, be stored for computing device 400 using any combination of memory element(s) 404 and/or storage 406. Note that in some embodiments, storage 406 can be consolidated with memory element(s) 404 (or vice versa), or can overlap/exist in any other suitable manner.

In at least one embodiment, bus 408 can be configured as an interface that enables one or more elements of computing device 400 to communicate in order to exchange information and/or data. Bus 408 can be implemented with any architecture designed for passing control, data and/or information between processors, memory elements/storage, peripheral devices, and/or any other hardware and/or software components that may be configured for computing device 400. In at least one embodiment, bus 408 may be implemented as a fast kernel-hosted interconnect, potentially using shared memory between processes (e.g., logic), which can enable efficient communication paths between the processes.

In various embodiments, network processor unit(s) 410 may enable communication between computing device 400 and other systems, entities, etc., via network I/O interface(s) 412 to facilitate operations discussed for various embodiments described herein. In various embodiments, network processor unit(s) 410 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 400 and other systems, entities, etc. to facilitate operations for various embodiments described herein. In various embodiments, network I/O interface(s) 412 can be configured as one or more Ethernet port(s), Fibre Channel ports, and/or any other I/O port(s) now known or hereafter developed. Thus, the network processor unit(s) 410 and/or network I/O interface(s) 412 may include suitable interfaces for receiving, transmitting, and/or otherwise communicating data and/or information in a network environment.

I/O interface(s) 414 allow for input and output of data and/or information with other entities that may be connected to computer device 400. For example, I/O interface(s) 414 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 420 can include instructions that, when executed, cause processor(s) 402 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

For example, in at least one implementation, control logic 420 can include instructions that, when executed, cause processor(s) 402 to perform operations including obtaining, a registration request for a user equipment to connect to a mobile network in which the mobile network includes a radio access network comprising a plurality of radio units in which each radio unit of the plurality of radio units provides a shared cell that is shared with other radio units of the plurality of radio units and each radio unit of the plurality of radio units provides a unique cell that is not shared with other radio units of the plurality of radio units; determining an operating mode for the user equipment, wherein the operating mode indicates whether the user equipment is to operate in a shared cell operating mode or a unique cell operating mode; and facilitating service connection of the user equipment to one of the shared cell or the unique cell of a radio unit of the radio access network based on the operating mode for the user equipment.

Figure 5:
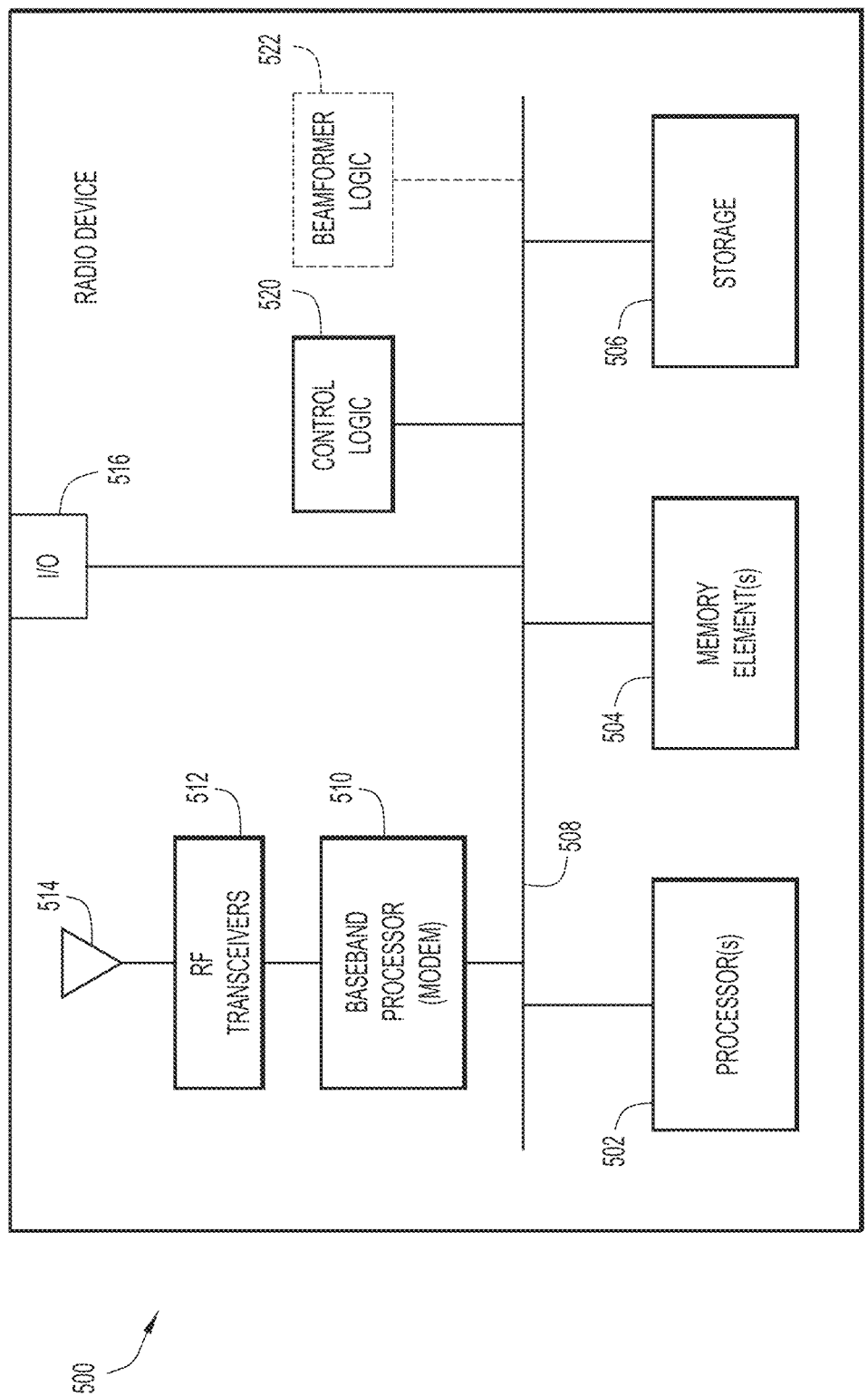
FIG. 5 is a hardware block diagram of a radio device that may perform functions associated with any combination of operations, in connection with the techniques discussed herein.

Referring to FIG. 5, FIG. 5 illustrates a hardware block diagram of a radio device 500 that may perform functions associated with operations discussed herein. In various embodiments, a radio device or apparatus, such as radio device 500 or any combination of radio devices 500, may be configured as any radio node/nodes as depicted herein in order to perform operations of the various techniques discussed herein, such as operations that may be performed by any of an RU (e.g., any of RU 130.1, 130.2, and 130.3) or a UE (e.g., any of UEs 102.1, 102.2, and 202).

In at least one embodiment, radio device 500 may be any apparatus that may include one or more processor(s) 502, one or more memory element(s) 504, storage 506, a bus 508, a baseband processor or modem 510, one or more radio RF transceiver(s) 512, one or more antennas or antenna arrays 514, one or more I/O interface(s) 516, and control logic 520. For embodiments in which radio device 500 may be implemented as an RU, the radio device 500 may additionally include beamformer logic 522 to perform beam resource related operations, as discussed herein. In various embodiments, instructions associated with logic for radio device 500 can overlap in any manner and are not limited to the specific allocation of instructions and/or operations described herein.

The one or more processor(s) 502, one or more memory element(s) 504, storage 506, bus 508, and I/O interface(s) 516 may be configured/implemented in any manner described herein, such as described herein at least with reference to FIG. 4.

The RF transceiver(s) 512 may perform RF transmission and RF reception of wireless signals via antenna(s)/antenna array(s) 514, and the baseband processor (modem) 510 performs baseband modulation and demodulation, etc. associated with such signals to enable wireless communications for radio device 500.

In various embodiments, control logic 520, can include instructions that, when executed, cause processor(s) 502 to perform operations, which can include, but not be limited to, providing overall control operations of radio device 500; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In various embodiments, beamformer logic 522, if implemented, can include instructions that, when executed, cause processor(s) 502 to perform beam related operations as discussed herein, which can include, but not be limited to, providing beamforming operations (e.g., transmissions, receptions, signaling, measurements, etc.); interacting with other entities, systems, etc. (e.g., DU 132); maintaining and/or interacting with stored data, information, parameters, etc. (e.g., memory element(s), storage, data structures, databases, tables, etc. storing beam-ID/beam resource information, etc. for one or more groups of UEs); combinations thereof; and/or the like to facilitate various operations for embodiments described herein.

The programs described herein (e.g., control logic 420/520 and beamformer logic 522, if implemented) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 404/504 and/or storage 406/506 can store data, software, code, instructions (e.g., processor instructions), logic, parameters, combinations thereof, and/or the like used for operations described herein. This includes memory element(s) 404/504 and/or storage 406/506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include obtaining, by a network element of a mobile network, a registration request for a user equipment, wherein the mobile network includes a radio access network comprising a plurality of radio units in which each radio unit of the plurality of radio units provides a shared cell that is shared with at least one other radio unit of the plurality of radio units and each radio unit of the plurality of radio units provides a unique cell that is not shared with any other radio units of the plurality of radio units; determining an operating mode for the user equipment, wherein the operating mode indicates whether the user equipment is to operate in a shared cell operating mode or a unique cell operating mode; and facilitating service connection of the user equipment to one of the shared cell or the unique cell of a particular radio unit of the plurality of radio units of the radio access network based on the operating mode for the user equipment.

In one instance, the method may further include configuring a policy with operating mode information that indicates a first group of user equipment that are to operate in the shared cell operating mode and that indicates a second group of user equipment that are to operate in the unique cell operating mode. In one instance, the first group of user equipment are latency sensitive user equipment and the second group of user equipment are non-latency sensitive user equipment.

In one instance, determining the operating mode for the user equipment further includes determining a group to which the user equipment belongs based on the operating mode information configured for the policy; and determining whether the user equipment is to operate in the shared cell operating mode or the unique cell operating mode based on the group to which the user equipment belongs.

In one instance, the method may further include configuring the policy with beam resource information indicating first beam resources that can be utilized by the first group of user equipment and second beam resources that can be utilized by the second group of user equipment. In one instance, the first beam resources are associated with broadcast beam resources for the first group of user equipment and the second beam resources are associated with single beam resources.

In one instance, the method may further include configuring the operating mode for the user equipment prior to obtaining the registration request for the user equipment. In one instance, the operating mode for the user equipment can be included in a SIM profile configured for the user equipment.

In one instance, facilitating service connection of the user equipment to one of the shared cell or the unique cell of the radio unit of the radio access network further includes switching the operating mode of the user equipment between the shared cell operating mode and the unique operating cell mode.

In one instance, the method may further include configuring each radio unit of the plurality of radio units with one cell global identifier (CGI) and one physical cell identifier (PCI) in which the one CGI and the one PCI are shared by each radio unit of the plurality of radio units for providing the shared cell; and configuring each radio unit of the plurality of radio units with a unique CGI and a unique PCI in which each unique CGI and each unique PCI configured for each radio unit is not shared by another radio unit for providing each unique cell.

In summary, techniques herein may provide for defining an approach to configure hybrid cells supporting shared cell and unique cell operating modes in RAN architectures, such as a virtualized RAN (vRAN) architectures. In particular, techniques herein may facilitate the efficient sharing of RAN resources between the shared cell and unique cell operating modes and also provide for the classification of different user equipment (UE) based on device type, etc. in order to bind UEs to one of the two operating modes.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    obtaining, by a network element of a mobile network, a registration request for a user equipment, wherein the mobile network includes a radio access network comprising a plurality of radio units in which each radio unit of the plurality of radio units provides a shared cell that is shared with at least one other radio unit of the plurality of radio units and each radio unit of the plurality of radio units provides a unique cell that is not shared with any other radio units of the plurality of radio units, and wherein a policy includes operating mode information that indicates a first group of user equipment that are to operate in a shared cell operating mode and that indicates a second group of user equipment that are to operate in a unique cell operating mode;
    determining, based on the policy, an operating mode for the user equipment, wherein the operating mode indicates whether the user equipment is to operate in the shared cell operating mode or the unique cell operating mode; and
    facilitating service connection of the user equipment to one of the shared cell or the unique cell of a particular radio unit of the plurality of radio units of the radio access network based on the operating mode for the user equipment.

2. The method of claim 1, wherein the first group of user equipment are latency sensitive user equipment and the second group of user equipment are non-latency sensitive user equipment.

3. The method of claim 1, wherein determining the operating mode for the user equipment further comprises:
    determining a group to which the user equipment belongs based on the operating mode information configured for the policy; and
    determining whether the user equipment is to operate in the shared cell operating mode or the unique cell operating mode based on the group to which the user equipment belongs.

4. The method of claim 1, further comprising:
    configuring the policy with beam resource information indicating first beam resources that can be utilized by the first group of user equipment and second beam resources that can be utilized by the second group of user equipment.

5. The method of claim 4, wherein the first beam resources are associated with broadcast beam resources for the first group of user equipment and the second beam resources are associated with single beam resources.

6. The method of claim 1, wherein facilitating the service connection of the user equipment to one of the shared cell or the unique cell of the particular radio unit of the plurality of radio units of the radio access network further comprises:
    switching the operating mode of the user equipment between the shared cell operating mode and the unique cell operating mode.

7. The method of claim 1, further comprising:
    configuring each radio unit of the plurality of radio units with one cell global identity (CGI) and one physical cell identifier (PCI) in which the one CGI and the one PCI are shared by each radio unit of the plurality of radio units for providing the shared cell; and
    configuring each radio unit of the plurality of radio units with a unique CGI and a unique PCI in which each unique CGI and each unique PCI configured for each radio unit is not shared by another radio unit for providing each unique cell.

8. One or more non-transitory computer readable storage media encoded with instructions that, when executed by a processor, cause the processor to perform operations, comprising:
    obtaining, by a network element of a mobile network, a registration request for a user equipment, wherein the mobile network includes a radio access network comprising a plurality of radio units in which each radio unit of the plurality of radio units provides a shared cell that is shared with at least one other radio unit of the plurality of radio units and each radio unit of the plurality of radio units provides a unique cell that is not shared with any other radio units of the plurality of radio units, and wherein a policy includes operating mode information that indicates a first group of user equipment that are to operate in a shared cell operating mode and that indicates a second group of user equipment that are to operate in a unique cell operating mode;
    determining, based on the policy, an operating mode for the user equipment, wherein the operating mode indicates whether the user equipment is to operate in the shared cell operating mode or the unique cell operating mode; and facilitating service connection of the user equipment to one of the shared cell or the unique cell of a particular radio unit of the plurality of radio units of the radio access network based on the operating mode for the user equipment.

9. The media of claim 8, wherein the first group of user equipment are latency sensitive user equipment and the second group of user equipment are non-latency sensitive user equipment.

10. The media of claim 8, wherein determining the operating mode for the user equipment further comprises:
    determining a group to which the user equipment belongs based on the operating mode information configured for the policy; and
    determining whether the user equipment is to operate in the shared cell operating mode or the unique cell operating mode based on the group to which the user equipment belongs.

11. The media of claim 8, wherein the policy further includes beam resource information indicating first beam resources that can be utilized by the first group of user equipment and second beam resources that can be utilized by the second group of user equipment.

12. The media of claim 11, wherein the first beam resources are associated with broadcast beam resources for the first group of user equipment and the second beam resources are associated with single beam resources.

13. An apparatus comprising:
    at least one memory element for storing data; and
    at least one processor for executing instructions associated with the data, wherein executing the instructions causes the apparatus to perform operations, comprising:
    obtaining, by a network element of a mobile network, a registration request for a user equipment, wherein the mobile network includes a radio access network comprising a plurality of radio units in which each radio unit of the plurality of radio units provides a shared cell that is shared with at least one other radio unit of the plurality of radio units and each radio unit of the plurality of radio units provides a unique cell that is not shared with any other radio units of the plurality of radio units, and wherein a policy includes operating mode information that indicates a first group of user equipment that are to operate in a shared cell operating mode and that indicates a second group of user equipment that are to operate in a unique cell operating mode;
    determining, based on the policy, an operating mode for the user equipment, wherein the operating mode indicates whether the user equipment is to operate in the shared cell operating mode or the unique cell operating mode; and
    facilitating service connection of the user equipment to one of the shared cell or the unique cell of a particular radio unit of the plurality of radio units of the radio access network based on the operating mode for the user equipment.

14. The apparatus of claim 13, wherein determining the operating mode for the user equipment further comprises:
    determining a group to which the user equipment belongs based on the operating mode information configured for the policy; and
    determining whether the user equipment is to operate in the shared cell operating mode or the unique cell operating mode based on the group to which the user equipment belongs.

15. The apparatus of claim 13, wherein the policy further includes beam resource information indicating first beam resources that can be utilized by the first group of user equipment and second beam resources that can be utilized by the second group of user equipment.

16. The apparatus of claim 15, wherein the first beam resources are associated with broadcast beam resources for the first group of user equipment and the second beam resources are associated with single beam resources.

17. The apparatus of claim 13, wherein facilitating the service connection of the user equipment to one of the shared cell or the unique cell of the particular radio unit of the plurality of radio units of the radio access network further comprises:
    switching the operating mode of the user equipment between the shared cell operating mode and the unique cell operating mode.

18. The apparatus of claim 13, wherein executing the instructions causes the apparatus to perform further operations, comprising:
    configuring each radio unit of the plurality of radio units with one cell global identity (CGI) and one physical cell identifier (PCI) in which the one CGI and the one PCI are shared by each radio unit of the plurality of radio units for providing the shared cell; and
    configuring each radio unit of the plurality of radio units with a unique CGI and a unique PCI in which each unique CGI and each unique PCI configured for each radio unit is not shared by another radio unit for providing each unique cell.

19. The media of claim 8, wherein facilitating the service connection of the user equipment to one of the shared cell or the unique cell of the particular radio unit of the plurality of radio units of the radio access network further comprises:
    switching the operating mode of the user equipment between the shared cell operating mode and the unique cell operating mode.

20. The media of claim 8, further comprising instructions that, when executed by the processor, cause the processor to perform further operations, comprising:
    configuring each radio unit of the plurality of radio units with one cell global identity (CGI) and one physical cell identifier (PCI) in which the one CGI and the one PCI are shared by each radio unit of the plurality of radio units for providing the shared cell; and
    configuring each radio unit of the plurality of radio units with a unique CGI and a unique PCI in which each unique CGI and each unique PCI configured for each radio unit is not shared by another radio unit for providing each unique cell.

* * * * *